United States Patent
Beckman et al.

(10) Patent No.: US 10,468,008 B2
(45) Date of Patent: Nov. 5, 2019

(54) ACTIVE AIRBORNE NOISE ABATEMENT

(71) Applicant: Amazon Technologies, Inc., Seattle, WA (US)

(72) Inventors: Brian C. Beckman, Newcastle, WA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/936,928

(22) Filed: Mar. 27, 2018

(65) Prior Publication Data

US 2018/0286372 A1    Oct. 4, 2018

Related U.S. Application Data

(63) Continuation of application No. 15/725,633, filed on Oct. 5, 2017, now Pat. No. 9,959,860, which is a
(Continued)

(51) Int. Cl.
*G10K 11/178*     (2006.01)
*G05D 19/02*     (2006.01)
(Continued)

(52) U.S. Cl.
CPC .......... *G10K 11/178* (2013.01); *B64C 39/024* (2013.01); *G05D 1/101* (2013.01);
(Continued)

(58) Field of Classification Search
CPC ........ B64C 2201/024; B64C 2201/027; B64C 2201/108; B64C 2220/00; B64C 39/024;
(Continued)

(56) References Cited

U.S. PATENT DOCUMENTS 4,562,589 A    12/1985    Warnaka et al.
5,224,168 A    6/1993    Martinez et al.
(Continued)

FOREIGN PATENT DOCUMENTS

JP    S59114597 A    7/1984
JP    H08194489 A    7/1996
(Continued)

OTHER PUBLICATIONS

International Search Report and Written Opinion of PCT Application No. PCT/US2016/048095 dated Nov. 30, 2016.
(Continued)

*Primary Examiner* — Tyler J Lee
(74) *Attorney, Agent, or Firm* — Athorus, PLLC

(57) ABSTRACT

Noises that are to be emitted by an aerial vehicle during operations may be predicted using one or more machine learning systems, algorithms or techniques. Anti-noises having equal or similar intensities and equal but out-of-phase frequencies may be identified and generated based on the predicted noises, thereby reducing or eliminating the net effect of the noises. The machine learning systems, algorithms or techniques used to predict such noises may be trained using emitted sound pressure levels observed during prior operations of aerial vehicles, as well as environmental conditions, operational characteristics of the aerial vehicles or locations of the aerial vehicles during such prior operations. Anti-noises may be identified and generated based on an overall sound profile of the aerial vehicle, or on individual sounds emitted by the aerial vehicle by discrete sources.

20 Claims, 18 Drawing Sheets

Related U.S. Application Data continuation of application No. 15/237,446, filed on Aug. 15, 2016, now Pat. No. 9,786,265, which is a continuation of application No. 14/858,270, filed on Sep. 18, 2015, now Pat. No. 9,442,496.

(51) Int. Cl.
*B64C 39/02* (2006.01)
*G06N 20/00* (2019.01)
*G05D 27/02* (2006.01)
*G05D 1/10* (2006.01)
*G01S 19/13* (2010.01)

(52) U.S. Cl.
CPC ............ *G05D 19/02* (2013.01); *G05D 27/02* (2013.01); *G06N 20/00* (2019.01); *G10K 11/17823* (2018.01); *G10K 11/17853* (2018.01); *G10K 11/17873* (2018.01); *B64C 2201/024* (2013.01); *B64C 2201/027* (2013.01); *B64C 2201/108* (2013.01); *B64C 2220/00* (2013.01); *G01S 19/13* (2013.01); *G10K 2210/1281* (2013.01); *G10K 2210/3038* (2013.01); *G10K 2210/3045* (2013.01); *G10K 2210/30231* (2013.01); *G10K 2210/30351* (2013.01)

(58) Field of Classification Search
CPC ........ G01S 19/13; G05D 19/02; G05D 1/101; G05D 27/02; G06N 20/00; G10K 11/178; G10K 11/17823; G10K 11/17853; G10K 11/17873; G10K 2210/1281; G10K 2210/30231; G10K 2210/30351; G10K 2210/3038; G10K 2210/3045
See application file for complete search history.

(56) References Cited

U.S. PATENT DOCUMENTS

| | | | |
|---|---|---|---|
| 5,386,689 A | 2/1995 | Bozich et al. | |
| 5,515,444 A | 5/1996 | Burdisso et al. | |
| 5,789,678 A | 8/1998 | Pla | |
| 7,113,850 B2 | 9/2006 | Atmur | |
| 7,383,106 B1 | 6/2008 | Coonse | |
| 7,510,142 B2 | 3/2009 | Johnson | |
| 7,631,834 B1 | 12/2009 | Johnson et al. | |
| 9,151,272 B2* | 10/2015 | Goessling | F03D 7/026 |
| 9,567,979 B2* | 2/2017 | Goessling | F03D 7/026 |
| 2004/0114768 A1 | 6/2004 | Luo et al. | |
| 2005/0125114 A1 | 6/2005 | Atmur | |
| 2005/0271221 A1 | 12/2005 | Cerwin | |
| 2007/0200027 A1 | 8/2007 | Johnson | |
| 2010/0124337 A1 | 5/2010 | Wertz et al. | |
| 2013/0056581 A1 | 3/2013 | Sparks | |
| 2013/0163774 A1 | 6/2013 | Maeda | |
| 2014/0270220 A1 | 9/2014 | Bieler | |
| 2015/0056058 A1 | 2/2015 | Grissom et al. | |
| 2015/0125268 A1 | 5/2015 | Koopmann et al. | |
| 2015/0148988 A1 | 5/2015 | Fleck | |
| 2015/0184639 A1* | 7/2015 | Goessling | F03D 7/026 290/44 |
| 2015/0354539 A1* | 12/2015 | Goessling | F03D 7/026 290/44 |
| 2015/0370266 A1 | 12/2015 | Norris et al. | |
| 2016/0063987 A1 | 3/2016 | Xu et al. | |
| 2016/0379619 A1 | 12/2016 | Sugaya | |

FOREIGN PATENT DOCUMENTS

| | | |
|---|---|---|
| JP | H1049175 A | 2/1998 |
| JP | 2013210679 A | 10/2013 |
| JP | 2017009965 A | 1/2017 |
| WO | 1994008540 A1 | 4/1994 |
| WO | 2007103644 A2 | 9/2007 |
| WO | 2016029469 A1 | 3/2016 |

OTHER PUBLICATIONS

Scott M Hirsch et al: Control signal10 scheduling for active noise control systems, Smart Materials and Structures, IOP Publishing Ltd., Bristol, GB,vol. 8, No. 3, Jun. 1, 1999 {Jun. 1, 1999), pp. 315-323.

Sojeong Yoon et al: Advanced sound capturing method with adaptive noisereduction system for broadcasting multicopters, 2015 IEEE International Conference on Consumer Electronics (ICCE) , IEEE, Jan. 9, 2015 (Jan. 9, 2015), pp. 26-29.

Yoon et al., "Advanced Sound Capturing Method with Adaptive Noise Reduction System for Broadcasting Multicopters", IEEE International Conference on Consumer Electronics, 2015.

* cited by examiner

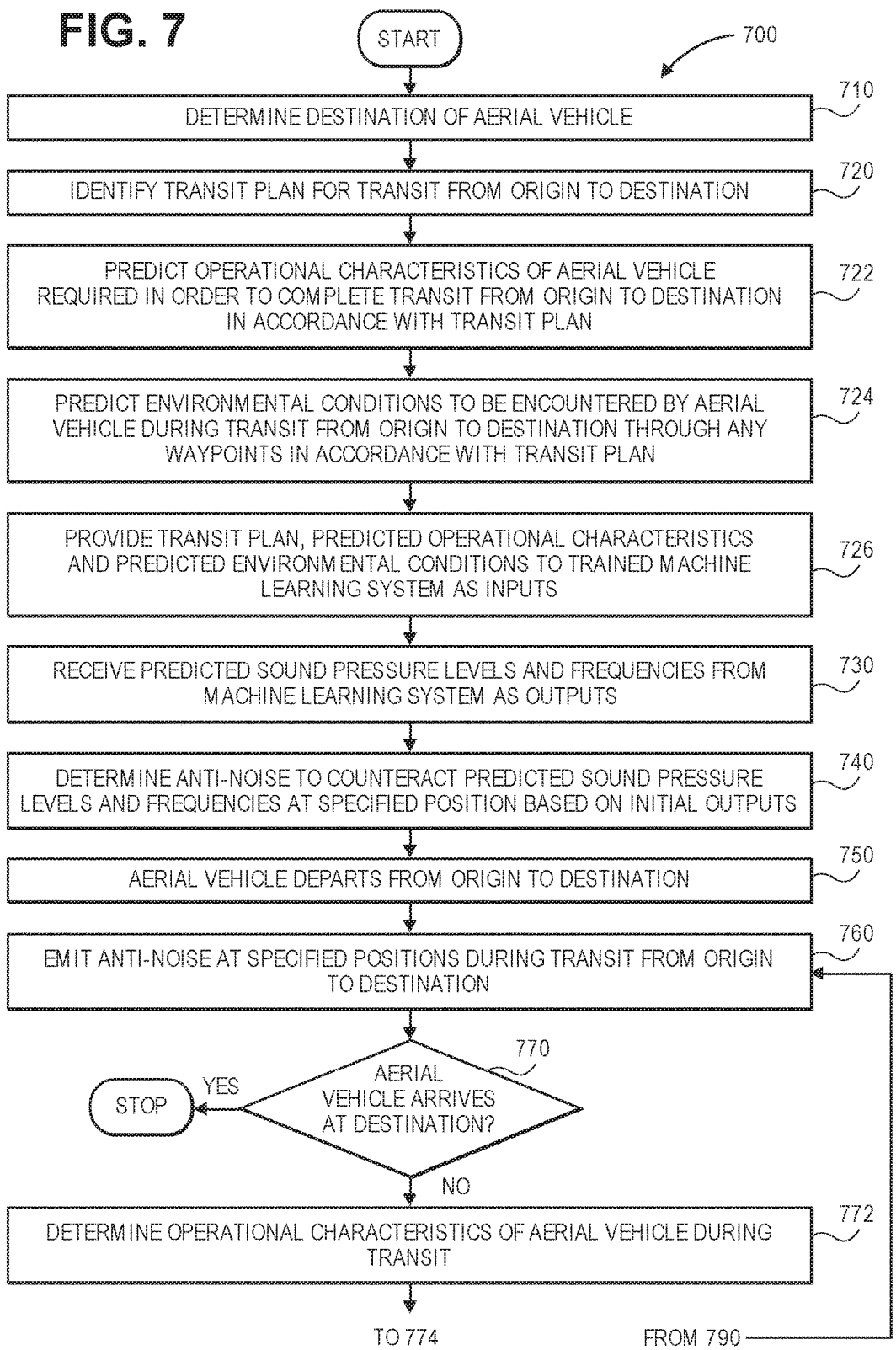

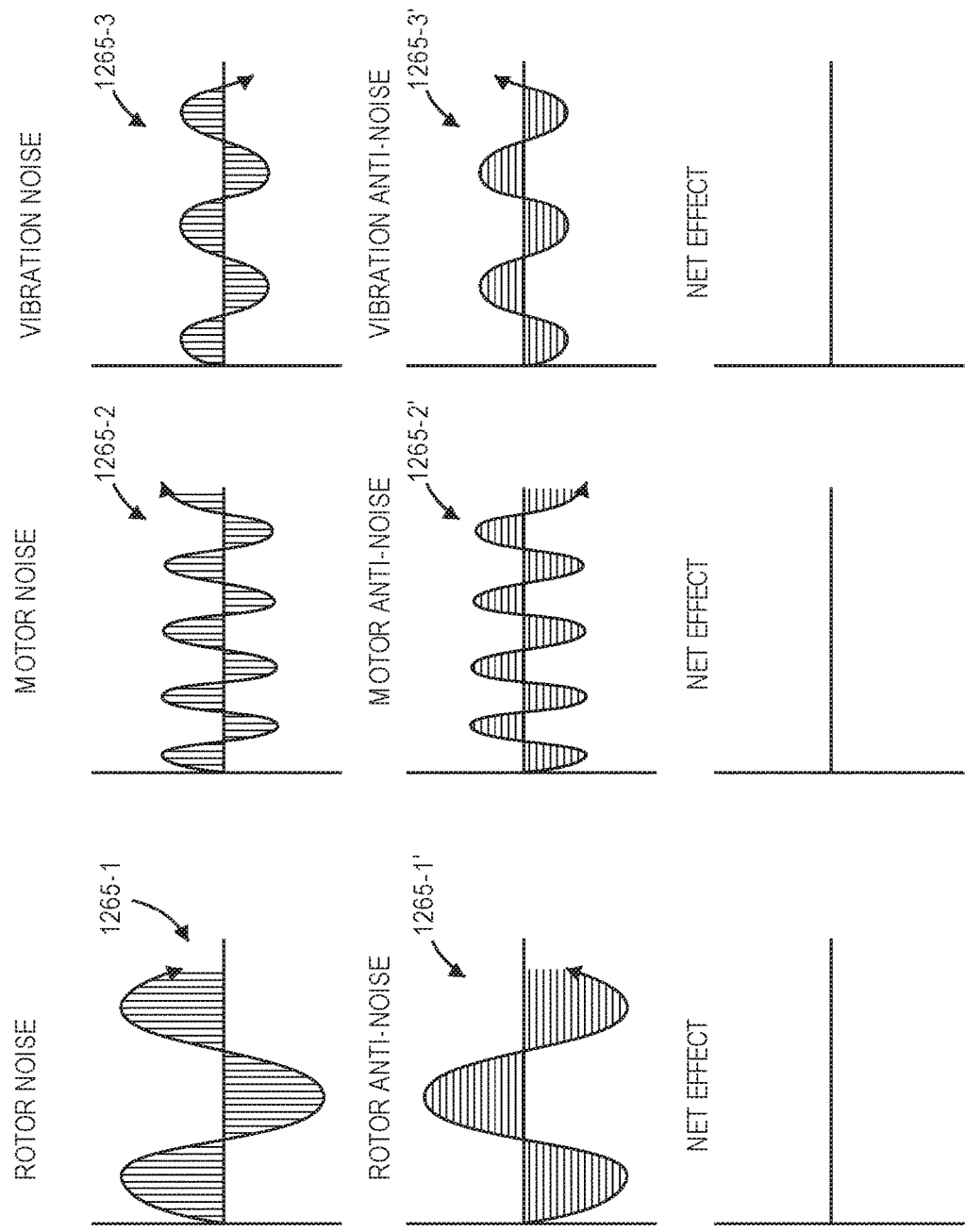

ACTIVE AIRBORNE NOISE ABATEMENT

CROSS-REFERENCE TO RELATED APPLICATIONS

This application is a continuation of U.S. patent application Ser. No. 15/725,633, now U.S. Pat. No. 9,959,860, filed Oct. 5, 2017, which is a continuation of U.S. patent application Ser. No. 15/237,446, filed Aug. 15, 2016, now U.S. Pat. No. 9,786,265, which is a continuation of U.S. patent application Ser. No. 14/858,270, filed Sep. 18, 2015, now U.S. Pat. No. 9,442,496. The contents of each of these documents are hereby incorporated by reference herein in their entirety.

BACKGROUND

Sound is kinetic energy released by the vibration of molecules in a medium, such as air. In industrial applications, sound may be generated in any number of ways or in response to any number of events. For example, sound may be generated in response to vibrations resulting from impacts or frictional contact between two or more bodies. Sound may also be generated in response to vibrations resulting from the rotation of one or more bodies such as shafts, e.g., by motors or other prime movers. Sound may be further generated in response to vibrations caused by fluid flow over one or more bodies. In essence, any movement of molecules, or contact between molecules, that causes a vibration may result in the emission of sound at a pressure level or intensity, and at one or more frequencies.

The use of unmanned aerial vehicles such as airplanes or helicopters having one or more propellers is increasingly common. Such vehicles may include fixed-wing aircraft, or rotary wing aircraft such as quad-copters (e.g., a helicopter having four rotatable propellers), octo-copters (e.g., a helicopter having eight rotatable propellers) or other vertical take-off and landing (or VTOL) aircraft having one or more propellers. Typically, each of the propellers is powered by one or more rotating motors or other prime movers.

With their ever-expanding prevalence and use in a growing number of applications, unmanned aerial vehicles frequently operate within a vicinity of humans or other animals. When an unmanned aerial vehicle is within a hearing distance, or earshot, of a human or other animal, noises generated by the unmanned aerial vehicle during operation may be detected by the human or the other animal. Such noises may include, but are not limited to, sounds generated by rotating propellers, operating motors or vibrating frames or structures of the unmanned aerial vehicle. Depending on the sizes of an unmanned aerial vehicle's propellers, the operational characteristics of its motors or the shapes or dimensions of its frame or structure, the net effect of the noises generated by the unmanned aerial vehicle may be annoying at best, or deafening at worst.

BRIEF DESCRIPTION OF THE DRAWINGS

FIG. 12A and FIG. 12B are views of aspects of one system for active airborne noise abatement in accordance with embodiments of the present disclosure.

DETAILED DESCRIPTION

Figure 1A:
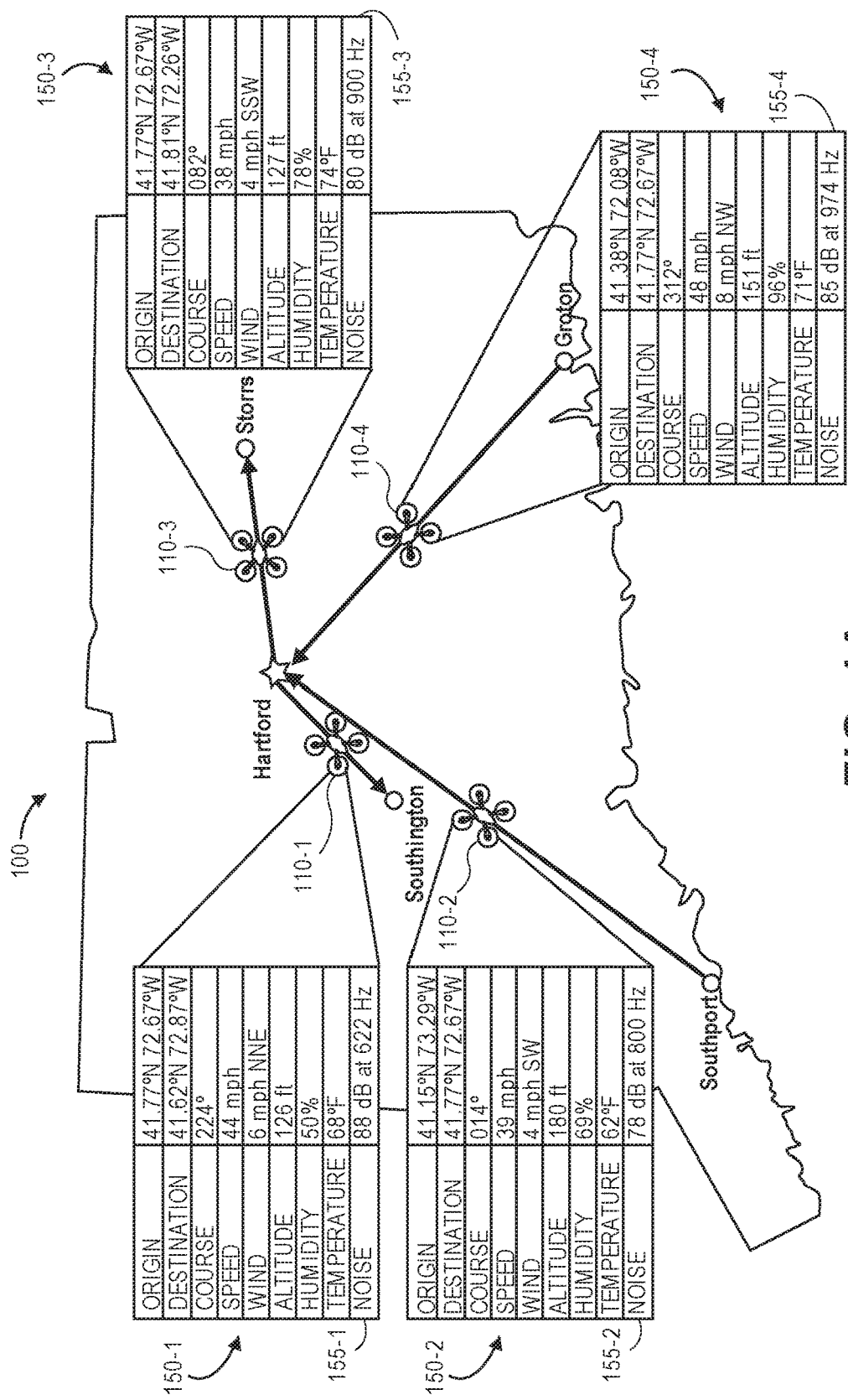
FIGS. 1A through 1D are views of aspects of one system for active airborne noise abatement in accordance with embodiments of the present disclosure.

As is set forth in greater detail below, the present disclosure is directed to actively abating airborne noise, including but not limited to noise generated by aerial vehicles during in-flight operations. More specifically, the systems and methods disclosed herein are directed to aerial vehicles, such as unmanned aerial vehicles, that are configured to capture a variety of information or data regarding acoustic energies that are generated or encountered during flight, and to correlate the information or data regarding the acoustic energies with information or data regarding the physical or operational environments in which the aerial vehicles were operating when the acoustic energies were generated or encountered. Such information or data may include, but is not limited to, extrinsic information or data, e.g., information or data not directly relating to the aerial vehicle, or intrinsic information or data, e.g., information or data relating to the aerial vehicle itself.

For example, extrinsic information or data may include, but is not limited to, environmental conditions (e.g., temperatures, pressures, humidities, wind speeds and directions), times of day or days of a week, month or year when an aerial vehicle is operating, measures of cloud coverage, sunshine, or surface conditions or textures (e.g., whether surfaces are wet, dry, covered with sand or snow or have any other texture) within a given environment, or any other factors that may influence which acoustic energy is reflected, absorbed, propagated or attenuated within the given environment. Intrinsic information or data may include, but is not limited to, operational characteristics (e.g., dynamic attributes such as altitudes, courses, speeds, rates of climb or descent, turn rates, or accelerations; or physical attributes such as dimensions of structures or frames, numbers of propellers or motors, operating speeds of such motors) or tracked positions (e.g., latitudes and/or longitudes) of the aerial vehicles when the acoustic energies are generated or encountered. In accordance with the present disclosure, the amount, the type and the variety of information or data that may be captured regarding the physical or operational environments in which aerial vehicles are operating and correlated with information or data regarding acoustic energies generated or encountered therein is theoretically unbounded.

The extrinsic information or data and/or the intrinsic information or data captured by aerial vehicles during flight may be used to train a machine learning system to associate an aerial vehicle's operations or locations, or conditions in such locations, with acoustic energy (e.g., sound pressure levels or intensities, or frequencies). The trained machine learning system, or a sound model developed using such a trained machine learned system, may then be used to predict noises that may be expected when an aerial vehicle operates in a predetermined location, or subject to a predetermined set of conditions, at given velocities or positions, or in accordance with any other characteristics. Once such noises are predicted, anti-noises, or sounds having substantially identical intensities or pressure levels and frequencies that are wholly out-of-phase with the predicted noises (e.g., having polarities that are reversed with respect to polarities of the predicted noises), may be determined, and subsequently emitted from the aerial vehicle during operations. When the anti-noises are emitted from one or more sources provided on the aerial vehicle, such anti-noises effectively cancel the effects of some or all of the predicted noises, thereby reducing or eliminating the sounds heard by humans or other animals within a vicinity of the aerial vehicle. In this regard, the systems and methods of the present disclosure may be utilized to effectively shape the aggregate sounds that are emitted by aerial vehicles during operation, using emitted anti-noises that are intended to counteract the predicted noises.

Referring to FIGS. 1A through 1D, views of aspects of one system 100 for active airborne noise abatement in accordance with embodiments of the present disclosure are shown. As is shown in FIG. 1A, a plurality of aerial vehicles 110-1, 110-2, 110-3, 110-4 are engaged in flight between origins and destinations. For example, the aerial vehicle 110-1 is shown en route between Hartford, Conn., and Southington, Conn., while the aerial vehicle 110-2 is shown en route between Southport, Conn., and Hartford. The aerial vehicle 110-3 is shown en route between Groton, Conn., and Hartford, while the aerial vehicle 110-4 is shown en route between Hartford and Storrs, Conn. The aerial vehicles 110-1, 110-2, 110-3, 110-4 are configured to capture extrinsic or intrinsic information or data 150-1, 150-2, 150-3, 150-4 regarding the aerial vehicles 110-1, 110-2, 110-3, and 110-4 and the environments in which the aerial vehicles 110-1, 110-2, 110-3, 110-4 are operating, including but not limited to information or data regarding locations, altitudes, courses, speeds, climb or descent rates, turn rates, accelerations, wind velocities, humidity levels and temperatures, using one or more sensors. The aerial vehicles 110-1, 110-2, 110-3, 110-4 are also configured to capture acoustic information or data regarding noise levels 155-1, 155-2, 155-3, 155-4 recorded during their respective flights.

For example, as is shown in the information or data 150-1 of FIG. 1A, the aerial vehicle 110-1 is traveling on a course of 224° and at a speed of 44 miles per hour (mph), in winds of 6 mph out of the northeast, at an altitude of 126 feet, and in air having 50 percent humidity and a temperature of 68 degrees Fahrenheit (° F.). The information or data 150-2 of FIG. 1A indicates that the aerial vehicle 110-2 is traveling on a course of 014° and at a speed of 39 mph, in winds of 4 mph out of the southwest, at an altitude of 180 feet, and in air having 69 percent humidity and a temperature of 62° F. The information or data 150-3 of FIG. 1A indicates that the aerial vehicle 110-3 is traveling on a course of 082° and at a speed of 38 mph, in winds of 4 mph out of the south southwest, at an altitude of 127 feet and in air having 78% humidity and a temperature of 74° F. Finally, the information or data 150-4 of FIG. 1A indicates that the aerial vehicle 110-4 is traveling on a course of 312° and at a speed of 48 mph, in winds of 8 mph out of the northwest, at an altitude of 151 feet and in air having 96 percent humidity and a temperature of 71° F.

Additionally, the information or data 155-1 indicates that the aerial vehicle 110-1 has recorded noise at a sound pressure level of 88 decibels (dB) and at a frequency of 622 Hertz (Hz). The information or data 155-2 indicates that the aerial vehicle 110-2 has recorded noise at a sound pressure level of 78 dB and at a frequency of 800 Hz, while the information or data 155-3 indicates that the aerial vehicle 110-3 has recorded noise at a sound pressure level of 80 dB and a frequency of 900 Hz, and the information or data 155-4 indicates that the aerial vehicle 110-4 has recorded noise at a sound pressure level of 85 dB and a frequency of 974 Hz.

Figure 1B:
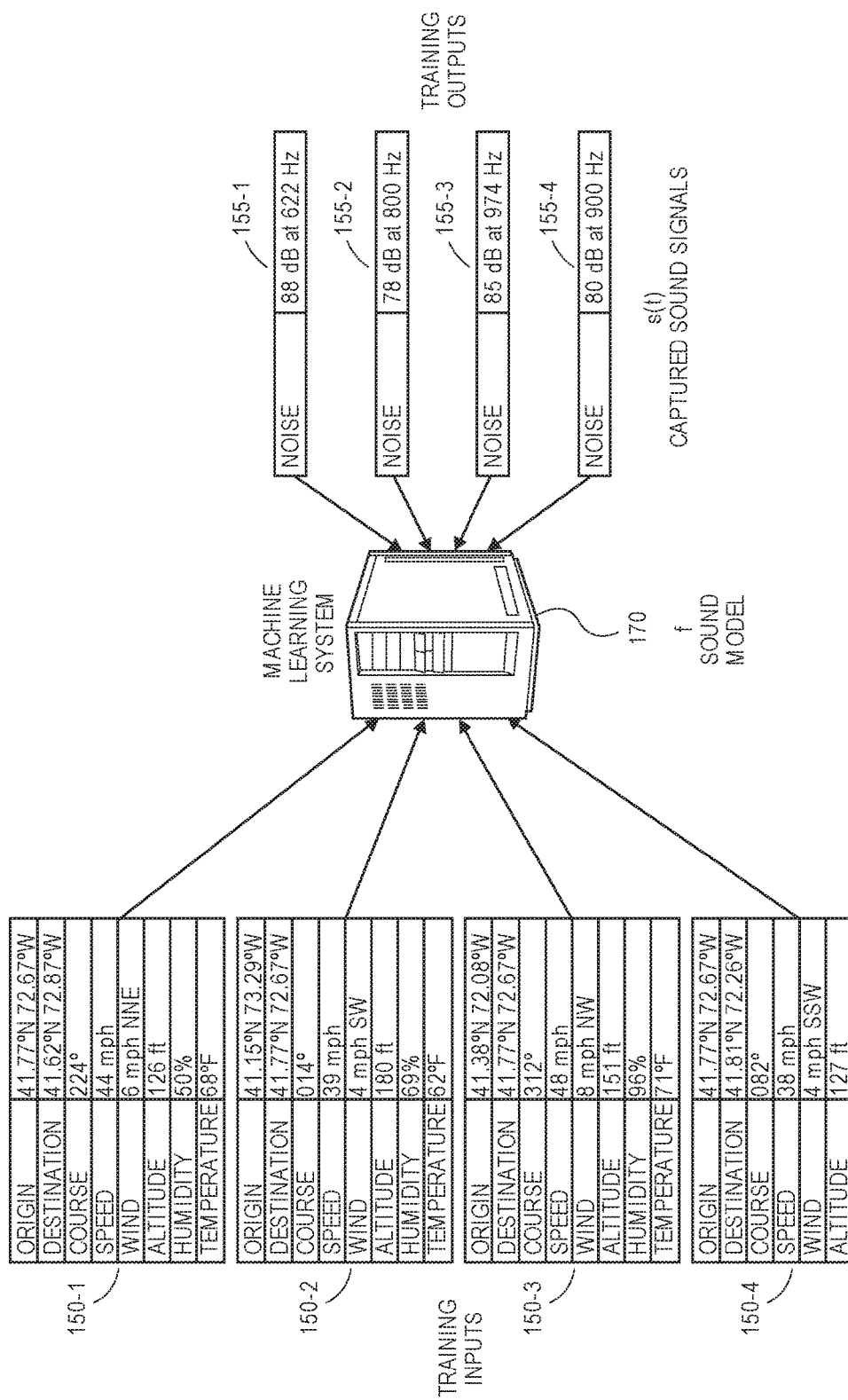

In accordance with the present disclosure, the aerial vehicles 110-1, 110-2, 110-3, 110-4 may be configured to provide both the extrinsic and intrinsic information or data 150-1, 150-2, 150-3, 150-4 (e.g., information or data regarding environmental conditions, operational characteristics or tracked positions of the aerial vehicles 110-1, 110-2, 110-3, 110-4), and also the information or data 155-1, 155-2, 155-3, 155-4 regarding the acoustic noise recorded during the transits of the aerial vehicles 110-1, 110-2, 110-3, 110-4, to a data processing system. The information or data 150-1, 150-2, 150-3, 150-4 and the information or data 155-1, 155-2, 155-3, 155-4 may be provided to the data processing system either in real time or in near-real time while the aerial vehicles 110-1, 110-2, 110-3, 110-4 are in transit, or upon their arrival at their respective destinations. Referring to FIG. 1B, the extrinsic and intrinsic information or data 150-1, 150-2, 150-3, 150-4, e.g., observed environmental signals e(t), is provided to a machine learning system 170 as a set of training inputs, and the information or data 155-1, 155-2, 155-3, 155-4, e.g., captured sound signals s(t), regarding the acoustic noise recorded during the transits of the aerial vehicles 110-1, 110-2, 110-3, 110-4 is provided to the machine learning system 170 as a set of training outputs.

The machine learning system 170 may be fully trained using a substantial corpus of observed environmental signals e(t) correlated with captured sound signals s(t) that are obtained using one or more of the aerial vehicles 110-1, 110-2, 110-3, 110-4, and others, to develop a sound model f. After the machine learning system 170 has been trained, and the sound model f has been developed, the machine learning system 170 may be provided with a set of extrinsic or intrinsic information or data (e.g., environmental conditions, operational characteristics, or positions) that may be anticipated in an environment in which an aerial vehicle is expected to operate. In some embodiments, the machine learning system 170 may reside and/or be operated on one or more computing devices or machines provided onboard one or more of the aerial vehicles 110-1, 110-2, 110-3, 110-4. The machine learning system 170 may receive information or data regarding the corpus of sound signals observed and the sound signals captured by the other aerial vehicles 110-1, 110-2, 110-3, 110-4, for training purposes and, once trained, the machine learning system 170 may receive extrinsic or intrinsic information or data that is actually observed by the aerial vehicle, e.g., in real time or in near-real time, as inputs and may generate outputs corresponding to predicted sound levels based on the information or data.

In other embodiments, the machine learning system 170 may reside and/or be operated on one or more centrally located computing devices or machines. The machine learning system 170 may receive information or data regarding the corpus of sound signals observed and the sound signals captured by each of the aerial vehicles 110-1, 110-2, 110-3, 110-4 in a fleet for training purposes. Once the machine learning system 170 is trained, the machine learning system 170 may be used to program computing devices or machines each of the aerial vehicles in a fleet with a sound model that predicts sounds to be generated or encountered by the aerial vehicles during operation, e.g., in real time or in near-real time, based on extrinsic or intrinsic information or data that is actually observed by the respective aerial vehicle. In still other embodiments, the machine learning system 170 may be programmed to receive extrinsic or intrinsic information or data from operating aerial vehicles, e.g., via wireless means, as inputs. The machine learning system 170 may then generate outputs corresponding to predicted sound levels based on the information or data and return such predicted levels to the aerial vehicles.

For example, when variables such as an origin, a destination, a speed and/or a planned altitude for the aerial vehicle 110 (e.g., a transit plan for the aerial vehicle) are known, and where variables such as environmental conditions, operational characteristics may be known or estimated, such variables may be provided as inputs to the trained machine learning system 170. Subsequently, information or data regarding sounds that may be predicted to be generated or encountered by the aerial vehicle 110 as the aerial vehicle 110 travels from the origin to the destination within such environmental conditions and according to such operational characteristics may be received from the trained machine learning system 170 as outputs. From such outputs, anti-noise, e.g., one or more signals that are substantially equal in intensity and opposite in phase to the sounds that may be predicted to be generated or encountered, may be determined in real time or near-real time as the aerial vehicle 110 is en route from the origin to the destination, or in one or more batch processing operations.

Figure 1C:
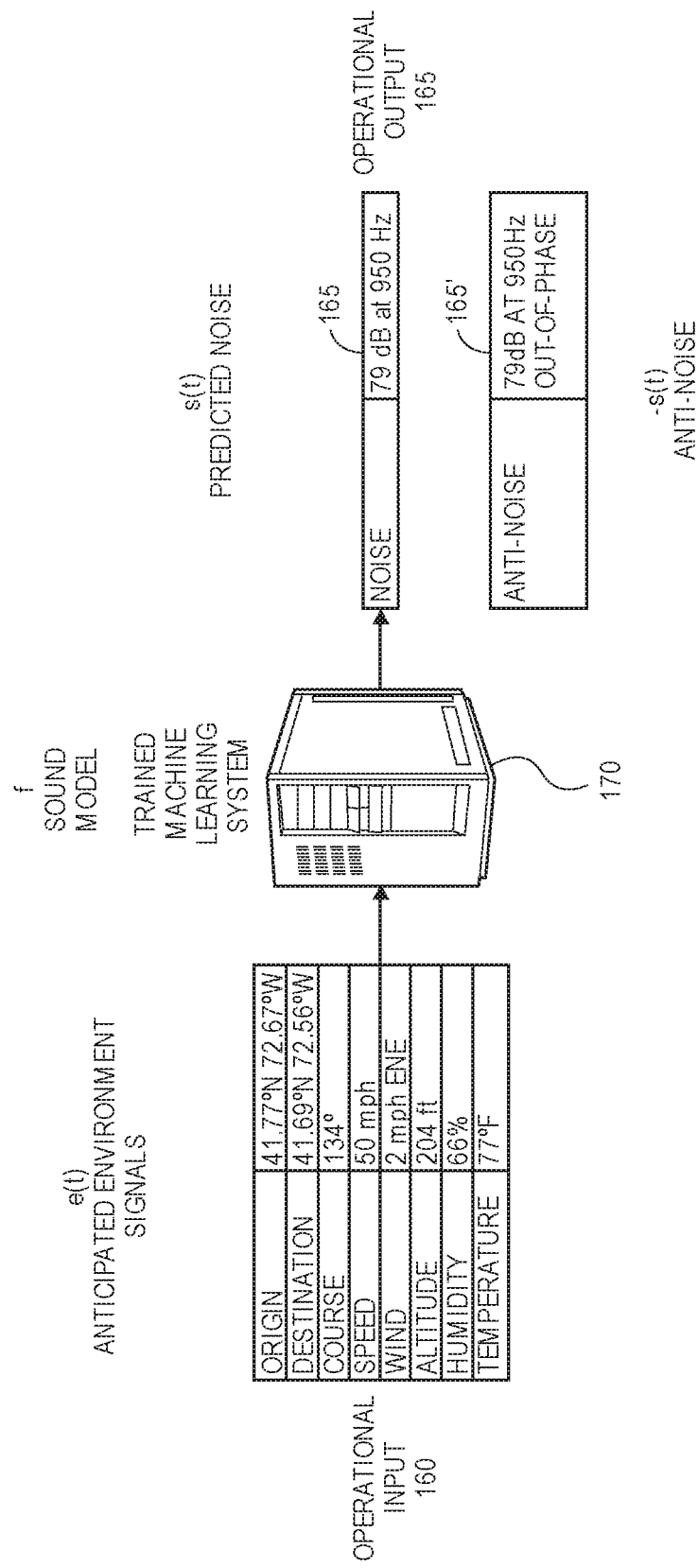

Referring to FIG. 1C, an operational input 160 in the form of environmental signals e(t) is provided to the trained machine learning system 170, and an operational output 165 in the form of predicted noise signals s(t) is produced by the sound model f and received from the trained machine learning system 170. For example, the operational input 160 may include extrinsic or intrinsic information or data regarding a planned transit of an aerial vehicle (e.g., predicted environmental or operational conditions), or extrinsic or intrinsic information or data regarding an actual transit of the aerial vehicle (e.g., actually observed or determined environmental or operational conditions), including but not limited to coordinates of an origin, a destination, or of any intervening points, as well as a course and a speed of the aerial vehicle, a wind velocity in a vicinity of the origin, the destination or one or more of the intervening points, an altitude at which the aerial vehicle is expected to travel, and a humidity level and a temperature in a vicinity of the origin, the destination or one or more of the intervening points. The operational output 165 may include information regarding noises that are expected to be generated or encountered when the aerial vehicle operates in a manner consistent with the operational input 160, e.g., when the aerial vehicle travels along a similar course or speed, or at a similar altitude, or encounters a similar wind velocity, humidity level, or temperature.

Based at least in part on the operational output 165 that was determined based on the operational input 160, an anti-noise 165', e.g., a noise having a predetermined sound pressure level or intensity, and a frequency that is one hundred eighty degrees out-of-phase, or -s(t), with the operational output 165. In some embodiments, the sound pressure level or the intensity of the anti-noise 165' may be selected to completely cancel out or counteract the effects of the noises associated with the operational output 165, e.g., such that the sound pressure level or the intensity of the anti-noise 165' equals the sound pressure level or intensity of the noises that may be expected to be generated or encountered during operation of the aerial vehicle 110, or of the noises that are actually generated or encountered. Alternatively, in some embodiments, the sound pressure level or the intensity of the anti-noise 165' may be selected to partially cancel out or counteract the effects of noises associated with the operational output 165, e.g., such that the sound pressure level or the intensity of the anti-noise 165' is less than the sound pressure level or intensity of the noises that may be expected during operation of the aerial vehicle 110. Moreover, where the operational output 165 identifies two or more noises that may be expected to be generated or encountered by an aerial vehicle based on the operational input 160, the anti-noise 165' may include sound pressure levels or intensities and frequencies of each of such noises, and each of such noises may be emitted from the aerial vehicle during operations.

Figure 1D:
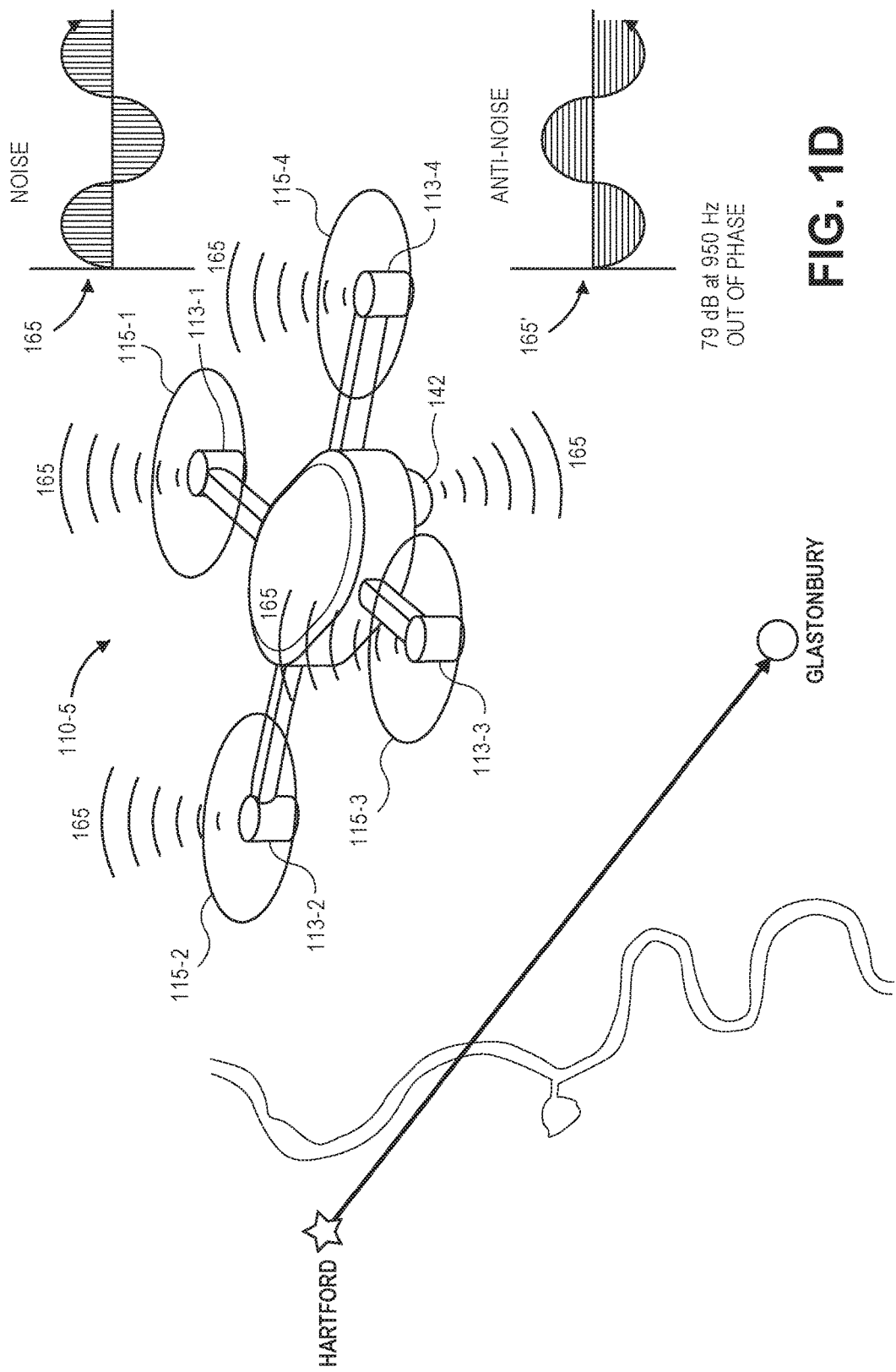

Referring to FIG. 1D, an aerial vehicle 110-5 including a plurality of rotors 113-1, 113-2, 113-3, 113-4 and a plurality of motors 115-1, 115-2, 115-3, 115-4 is shown en route from Hartford to Glastonbury, Conn. The aerial vehicle 110-5 is shown as emitting noise consistent with the operational output 165, and also the anti-noise 165' from one or more sound emitting devices 142 (e.g., a speaker). In this regard, the anti-noise 165' may cancel out noises that are consistent with the operational output 165 during normal operations.

Accordingly, the systems and methods of the present disclosure may be directed to actively abating airborne noise, e.g., noises emitted by aerial vehicles during normal operations. Information or data regarding acoustic energy generated by such aerial vehicles during such operations may be captured and stored, and provided to one or more machine learning systems along with extrinsic or intrinsic information or data regarding environmental conditions, operational characteristics, or tracked positions of the aerial vehicles when such acoustic energies were recorded. The machine learning systems may reside or operate on computing devices or machines provided on aerial vehicles or, alternatively, may reside or operate on centrally located or networked computing devices or machines that are accessible to one or more aerial vehicles in a fleet.

The machine learning systems of the present disclosure may operate in a number of phases or modes. First, in a data capturing phase or mode, a machine learning system, or one or more computing devices or machines on which the system resides or operates, captures one or more sets of training data during the operation of an aerial vehicle. Such training data may include all available information or data regarding environmental conditions and/or operating characteristics of an aerial vehicle, as well as any available information or data regarding sounds or other audio signals that are generated or encountered by the aerial vehicle during flight (e.g., sound pressure levels or intensities and frequencies of each of such noise). In some embodiments, the training data may further include video imagery or metadata associated with the environmental conditions, operating characteristics and/or sounds or other audio signals.

Once the training data has been captured, the machine learning system or the one or more computing devices or machines may transition to a training mode, in which the machine learning system is trained based on the imaging data, e.g., inputs in the form of trained environmental conditions, operating characteristics, and any other information or data regarding the operation of an aerial vehicle, such as video imagery or metadata, and outputs in the form of sounds or other audio signals generated or encountered by the aerial vehicle during flight. In the training mode, a sound model, or a function for predicting sounds to be generated or encountered by the aerial vehicle during operation based on environmental conditions and/or operating characteristics or other inputs, is derived. In some embodiments, the sound model may be trained to return a predicted sound based on inputs in accordance with the Nyquist frequency, e.g., approximately forty kilohertz (40 kHz), or in approximately twenty-five milliseconds (25 ms).

After the sound model has been derived, the machine learning system may operate in a prediction mode. For example, one or more computing devices or machines provided onboard an aerial vehicle may be configured to receive inputs from a variety of sources, including but not limited to onboard sensors, and to identify anticipated sounds based on such inputs according to the sound model. The inputs may comprise not only actual, determined information or data regarding the environmental conditions and/or operating characteristics of the aerial vehicle but also any information or data regarding predicted environmental conditions or operating characteristics of the aerial vehicle.

For example, a sound model may be configured to evaluate not only extrinsic or intrinsic information or data regarding the aerial vehicle that is captured in real time or near-real time from an aerial vehicle during operations but also predicted extrinsic or intrinsic information or data regarding such conditions or characteristics that may be anticipated in an area in which the aerial vehicle is operating. In this regard, the information or data utilized to identify anticipated sounds may be weighted based on the reliability of the extrinsic or intrinsic information or data determined using the onboard sensors (e.g., an extent to which the information or data may be expected to remain constant), the quality of the predicted extrinsic or intrinsic information or data (e.g., a level of confidence in estimates or forecasts on which such information or data is derived), or on any other factor. Moreover, predicted extrinsic or intrinsic information or data may be utilized exclusively to identify anticipated sounds in the event that one or more sensors onboard an aerial vehicle malfunctions during flight, or where an aerial vehicle operates without a full complement of sensors.

Once a sound model has predicted one or more sounds that may be anticipated by an aerial vehicle during normal operations, e.g., sound pressure levels or intensities and frequencies expected to be generated or encountered by the aerial vehicle, one or more anti-noises, e.g., sounds having substantially identical intensities or pressure levels and frequencies that are out-of-phase with the anticipated sounds, may be defined and emitted by the aerial vehicle during the normal operations. Moreover, where a machine learning system operates in a prediction mode, with the sound model predicting sounds anticipated by the aerial vehicle during such operations in real time or in near-real time based on one or more inputs, the machine learning system may also continue to capture additional information or data regarding sounds that were actually generated or encountered during such operations. Such additional information or data may be used to further update the machine learning system, and to generate a more refined sound model thereby.

When a machine learning system of the present disclosure is successfully trained to associate acoustic energy with environmental conditions, operational characteristics or tracked positions, e.g., when the machine learning system has successfully developed a sound model based on a corpus of recorded acoustic energy correlated with such environmental conditions, operational characteristics or tracked positions, information or data regarding a planned evolution of an aerial vehicle (e.g., a transit plan identifying a route or track along which the aerial vehicle is intended to travel between an origin and a destination, as well as altitudes, courses, speeds, climb or descent rates, turn rates or accelerations required in order to execute the transit plan, and environmental conditions within a vicinity of the route or track), or an actual evolution of the aerial vehicle (e.g., extrinsic or intrinsic information or data regarding the operation of the aerial vehicle traveling along the route or track between the origin and the destination) may be provided to the trained machine learning system, and one or more anti-noises to be emitted while the aerial vehicle is en route may be predicted. The anti-noises may generally relate to an overall sound profile of the aerial vehicle, or to sound profiles of discrete parts or components of the aerial vehicle (e.g., a first anti-noise directed to addressing noises emitted by rotating propellers, a second anti-noise directed to addressing noises emitted by operating motors, or a third anti-noise directed to addressing vibrations caused by air flowing over a chassis or fuselage). Thus, using historical data regarding operations of the aerial vehicles, and the environments in which such vehicles are operated, as well as information or data regarding such operations or such environments determined in real time or in near-real time, noises may be actively abated with predicted anti-noises emitted from one or more components of the aerial vehicles.

Sound is generated when motion or vibration of an object results in a pressure change in a medium, such as air, surrounding the object. For example, when such motion or vibration occurs, the densities of the molecules of the medium within a vicinity of the object are subjected to alternating periods of condensation and rarefaction, resulting in contractions and expansions of such molecules, which causes the issuance of a sound wave that may travel at speeds of approximately three hundred forty-three meters per second (343 m/s) in dry air. The intensity of sounds is commonly determined as a sound pressure level (or sound level), and is measured in logarithmic units called decibels (dB).

In industrial applications, noise is typically generated as either mechanical noise, fluid noise or electromagnetic noise. Mechanical noise typically results when a solid vibrating surface, e.g., a driven surface, or a surface in contact with one or linkages or prime movers, emits sound power that is a function of a density of a medium, the speed of sound within the medium, the vibrating area, the mean square vibrating velocity of the medium to a vibrating area and a mean square vibrating velocity, and the radiation efficiency of the material. Fluid noise generated by turbulent flow is generally proportional to multiple orders of flow velocity, e.g., six to eight powers greater than the velocity of the turbulent flow, while sound power generated by rotating fans is determined according to a function of flow rate and static pressure. In electric motors, noise may be generated due to airflow at inlets and outlets of cooling fans, bearing or casing vibrations, motor balancing shaft misalignment or improper motor mountings.

With regard to a frequency spectrum, emitted sounds generally fall into one of two categories. Sounds having energies that are typically concentrated or centered around discrete frequencies are classified as narrowband noise, or narrowband tonals, and are commonly periodic in nature. Narrowband noise is commonly encountered in many industrial applications. For example, many rotating machines such as internal combustion engines, compressors, vacuum pumps or other rotating machines may inherently vibrate at frequencies associated with their angular velocities, as well as electric power transformers that generate large magnetic fields and thereby vibrate at harmonics of line frequencies. Conversely, sounds having energies that are distributed across bands of frequencies are classified as broadband noise. Additionally, some machines or sound sources may emit sounds that are combinations of narrowband noise and broadband noise, e.g., sounds that have component energy levels that are concentrated about one or more discrete frequencies and also across entire frequency spectra.

One primary technique for active noise control or abatement is noise cancellation, in which a cancelling signal of "anti-noise" is generated electronically and emitted in the form of sound from transducers. In this regard, where anti-noise is substantially equal in amplitude to a narrowband noise centered around a discrete frequency, and is perfectly out-of-phase (e.g., one hundred eighty degrees out-of-phase, or of reverse polarity), and emitted in association with the narrowband noise, the anti-noise may effectively address or cancel the narrowband noise. The anti-noise may be determined with regard to narrowband noises that are cumulative of a plurality of noise sources, e.g., a single anti-noise emitted with respect to multiple noises, or with regard to narrowband noises from the plurality of noise sources individually, e.g., multiple anti-noises emitted with respect to one or more of the multiple noises. Alternatively, multiple narrowband anti-noises may be emitted simultaneously to address or cancel the effects of broadband noise.

The systems and methods of the present disclosure are directed to actively abating airborne noises, e.g., noises emitted by aerial vehicles. In some embodiments, aerial vehicles may capture information or data regarding acoustic energies generated or encountered by such vehicles during normal operations. Some of the acoustic energies may have been generated by the aerial vehicles themselves, e.g., noises emitted by rotating rotors, motors, or air flow over portions of the aerial vehicles, while other acoustic energies may be objective or intrinsic to the environments through which the aerial vehicles traveled (e.g., constant or predictable noises within such environments), and still other acoustic energies may be subjective or variable based on the times or dates on which the aerial vehicles traveled (e.g., weather or other unique events or occurrences on such times or dates).

Once captured, such information or data may be correlated with information or data regarding various environmental conditions encountered (e.g., temperatures, pressures, humidities, wind speeds, directions), operational characteristics (e.g., altitudes, courses, speeds, climb or descent rates, turn rates, accelerations, dimensions of structures or frames, numbers of propellers or motors, operating speeds of such motors) or tracked positions (e.g., latitudes and/or longitudes) of such aerial vehicles when the information or data regarding the acoustic energies was captured. The information or data regarding the acoustic conditions and also the environmental conditions, operational characteristics or positions may be captured using one or more onboard sensors, such as microphones, cameras or other imaging devices, piezoelectric monitors, or other like components, and provided to a machine learning system in real time, near-real time, or upon the arrival of the aerial vehicles at their intended destinations, in one or more synchronous, asynchronous or batch processing techniques. The machine learning system may reside or be provided on one or more computing devices or machines onboard the aerial vehicles themselves, or in another location that may be accessed by the aerial vehicles (e.g., wirelessly) over one or more networks during operation.

Subsequently, the information or data regarding the environmental conditions, operational characteristics or tracked positions may be provided to a machine learning system as training inputs, as well as independently available information such as times of day, or days of a week, month or year, and the information or data regarding the acoustic energies encountered may be provided to the machine learning system as training outputs. The machine learning system may be trained to develop a sound model that recognizes associations between the environmental conditions, operational characteristics and tracked positions and the acoustic energies. Once the machine learning system is sufficiently trained, information or data regarding an expected or planned transit of an aerial vehicle may be provided to the trained machine learning system as an input, and information or data regarding acoustic energies that are anticipated during the expected or planned transit may be received from the machine learning system as outputs. For example, where an aerial vehicle is intended to travel from an origin to a destination on a given day and time, information regarding the coordinates of the origin and the destination, as well as a course or bearing between the origin and the destination, a projected speed and/or altitude of the aerial vehicle or any projected weather conditions on the day and at the time may be provided to the trained machine learning system, and an anticipated acoustic energy (e.g., noise level) may be received from the trained machine learning system. An anti-noise, or one or more anti-noises, to be emitted by the aerial vehicle during operation may be predicted by the machine learning system based on the anticipated acoustic energies. Subsequently, as actual environmental or operational conditions of the aerial vehicle are determined while the aerial vehicle is en route from the origin to the destination, e.g., from one or more onboard sensors, such information or data may be provided to the trained machine learning system, and the machine learning system may be updated based on the information or data accordingly.

Those of ordinary skill in the pertinent arts will recognize that any type or form of machine learning system (e.g., hardware and/or software components or modules) may be utilized in accordance with the present disclosure. For example, an emitted noise level may be associated with one or more of an environmental condition, an operating characteristic or a physical location or position of an aerial vehicle according to one or more machine learning algorithms or techniques, including but not limited to nearest neighbor methods or analyses, artificial neural networks, conditional random fields, factorization methods or techniques, K-means clustering analyses or techniques, similarity measures such as log likelihood similarities or cosine similarities, latent Dirichlet allocations or other topic models, or latent semantic analyses. Using any of the foregoing algorithms or techniques, or any other algorithms or techniques, a relative association between emitted sounds and such environmental conditions, operating characteristics or locations of aerial vehicles may be determined.

For example, all environmental conditions, operating characteristics or locations falling within a predefined threshold proximity of one another may be placed in or associated with a common cluster or group for a given intensity or frequency of emitted sound. Such clusters or groups may be defined for an entire set of such conditions, characteristics or locations, or, alternatively, among a subset, or a training set, of such conditions, characteristics, or locations in the product catalog, and extrapolated among the remaining conditions, characteristics, or locations. Similarly, clusters or groups of conditions, characteristics, or locations may be defined and associated with emitted sounds based on co-occurrence frequencies, correlation measurements or any other associations of the conditions, characteristics, or locations.

In some embodiments, a machine learning system may identify not only a sound pressure level or intensity and a frequency of a predicted noise but also a confidence interval, confidence level or other measure or metric of a probability or likelihood that the predicted noise will be generated or encountered by an aerial vehicle in a given environment that is subject to given operational characteristics at a given position. Where the machine learning system is trained using a sufficiently large corpus of recorded environmental signals and sound signals, and a reliable sound model is developed, the confidence interval associated with a sound pressure level or intensity and a frequency of an anti-sound identified thereby may be substantially high. Where the machine learning system is not adequately trained with respect to a given environment, given operational characteristics or a given position, however, the confidence interval associated with the sound pressure level or intensity and the frequency may be substantially low.

Moreover, in some embodiments, a machine learning system may identify two or more noises or sounds that may be expected to be generated or encountered by an aerial vehicle during operations. In such instances, two or more corresponding anti-noises having corresponding sound pressure levels or intensities and frequencies may also be identified in response to the identification of such noises or sounds. For example, in some embodiments, the anti-noises may be independently and simultaneously emitted during operations, e.g., at the sound pressure levels or intensities at full strength, from one or more sound emitters provided on the aerial vehicle. In this regard, sound waves associated with the anti-noise signals may constructively or destructively interfere with one another according to wave superposition principles. Alternatively, in some embodiments, the anti-noises may be emitted according to a weighted superposition, wherein one of the anti-noise signals is emitted at a greater sound pressure level or intensity than another of the anti-noise signals, or at a predetermined weighting or ratio with respect to other various anti-noise signals.

In accordance with the present disclosure, the extent of extrinsic or intrinsic information or data that may be captured regarding acoustic energy generated or encountered by an aerial vehicle or the environmental conditions, operational characteristics or positions of the aerial vehicle, and subsequently stored and evaluated, is not limited. For example, where a fleet of aerial vehicles operates in a given area on a regular basis, e.g., at varying times of a day, days of a week, or weeks, months or seasons of a year, vast sums of information or data regarding acoustic energies generated or encountered by such vehicles during operation may be captured and provided to a machine learning system, and the machine learning system may repeatedly train and retrain itself as new information or data becomes available. As a result, a sound model produced as a result of the training of the machine learning system is continuously refined, and the quality of the predictions of acoustic energies identified thereby is improved. Furthermore, aerial vehicles may be directed to either capturing information or data that may be used to identify anti-noises, or to emit anti-noises based on previously captured information or data. Alternatively, an aerial vehicle may both emit anti-noises based on previously captured information or data while also capturing information or data to be used to further improve predictions of generated or encountered noises, and the subsequent generation of anti-noises, in the future, thereby continuing to refine the process by which noises are predicted, and anti-noises are generated.

Moreover, although one variable that may be associated with acoustic energies encountered by an aerial vehicle is a position of the aerial vehicle (e.g., a latitude or longitude), and that extrinsic or intrinsic information or data associated with the position may be used to predict acoustic energies generated or encountered by the aerial vehicle at that position, those of ordinary skill in the pertinent arts will recognize that the systems and methods of the present disclosure are not so limited. Rather, acoustic energies may be predicted for areas or locations having similar environmental conditions or requiring aerial vehicles to exercise similar operational characteristics. For example, because environmental conditions in Vancouver, British Columbia, and in London, England, are known to be generally similar to one another, information or data gathered regarding the acoustic energies generated or encountered by aerial vehicles operating in the Vancouver area may be used to predict acoustic energies that may be generated or encountered by aerial vehicles operating in the London area, or to generate anti-noise signals to be emitted by aerial vehicles operating in the London area. Likewise, information or data gathered regarding the acoustic energies generated or encountered by aerial vehicles operating in the London area may be used to predict acoustic energies that may be generated or encountered by aerial vehicles operating in the Vancouver area, or to generate anti-noise signals to be emitted by aerial vehicles operating in the Vancouver area.

Those of ordinary skill in the pertinent arts will recognize that anti-noise may be emitted from any type of sound emitting device in accordance with the present disclosure. For example, where noise is anticipated at a given intensity and frequency, anti-noise of the same or a similar intensity may be emitted at the frequency, one hundred eighty degrees out-of-phase or of reverse polarity, from not only a traditional audio speaker but also from other devices such as piezoelectric components that are configured to vibrate at given resonant frequencies upon being energized or excited by an electric source.

Additionally, those of ordinary skill in the pertinent arts will further recognize that anti-noise may be emitted constantly, e.g., throughout an entire duration of a transit by an aerial vehicle, or at particular intervals or in specific locations that are selected based on one or more intrinsic or extrinsic requirements. For example, where an aerial vehicle is operating out of earshot of any human or other animal, e.g., in locations where no such humans are expected to be located, such as over water, deserts, or ice, anti-noise need not be emitted, and battery levels or other onboard electric power may be conserved. Similarly, where an aerial vehicle is operating in a location where the noise emitted by the aerial vehicle is comparatively irrelevant, e.g., where the noise emitted by the aerial vehicle is dwarfed by other ambient noise, anti-noise need not be emitted. Furthermore, anti-noise may, but need not, account for all noise emitted by an aerial vehicle during operation. For example, anti-noise may be emitted at equal intensity levels to noise encountered by an aerial vehicle, and at frequencies that are one hundred eighty degrees out-of-phase, or of reverse polarity, with the intent of eliminating or reducing the effects of such noise to the maximum extent practicable. Alternatively, anti-noise may be emitted at intensity levels that are less than the intensity of the noise encountered by the aerial vehicle, and may be intended to reduce the effects of such noise to within allowable specifications or standards.

Moreover, in accordance with the present disclosure, a trained machine learning system may be used to develop sound profiles for aerial vehicles based on their sizes, shapes, or configurations, and with respect to environmental conditions, operational characteristics, or locations of such aerial vehicles. Based on such sound profiles, anti-noise levels may be determined for such aerial vehicles as a function of the respective environmental conditions, operational characteristics or locations and emitted on an as-needed basis. Alternatively, the trained machine learning system may be used to develop sound profiles for individual, particular aspects of an aerial vehicle. For example, a sound profile may be determined for a rotor or propeller of a given size (e.g., diameter), number of blades, or other attributes, or for a motor having a given power level, capacity or operational speed, or an airframe of given dimensions, sizes or shapes. Where aspects of aerial vehicles are interchangeable with one another, e.g., where a given rotor or motor may be utilized on different aerial vehicle airframes, an overall sound profile for the aerial vehicle may be constructed from the individual sound profiles of the respective aspects. Anti-noise levels may be determined for and emitted by an aerial vehicle based on an overall sound profile of the aerial vehicle, or the individual sound profiles of the respective parts thereof, in accordance with the present disclosure.

Figure 2:
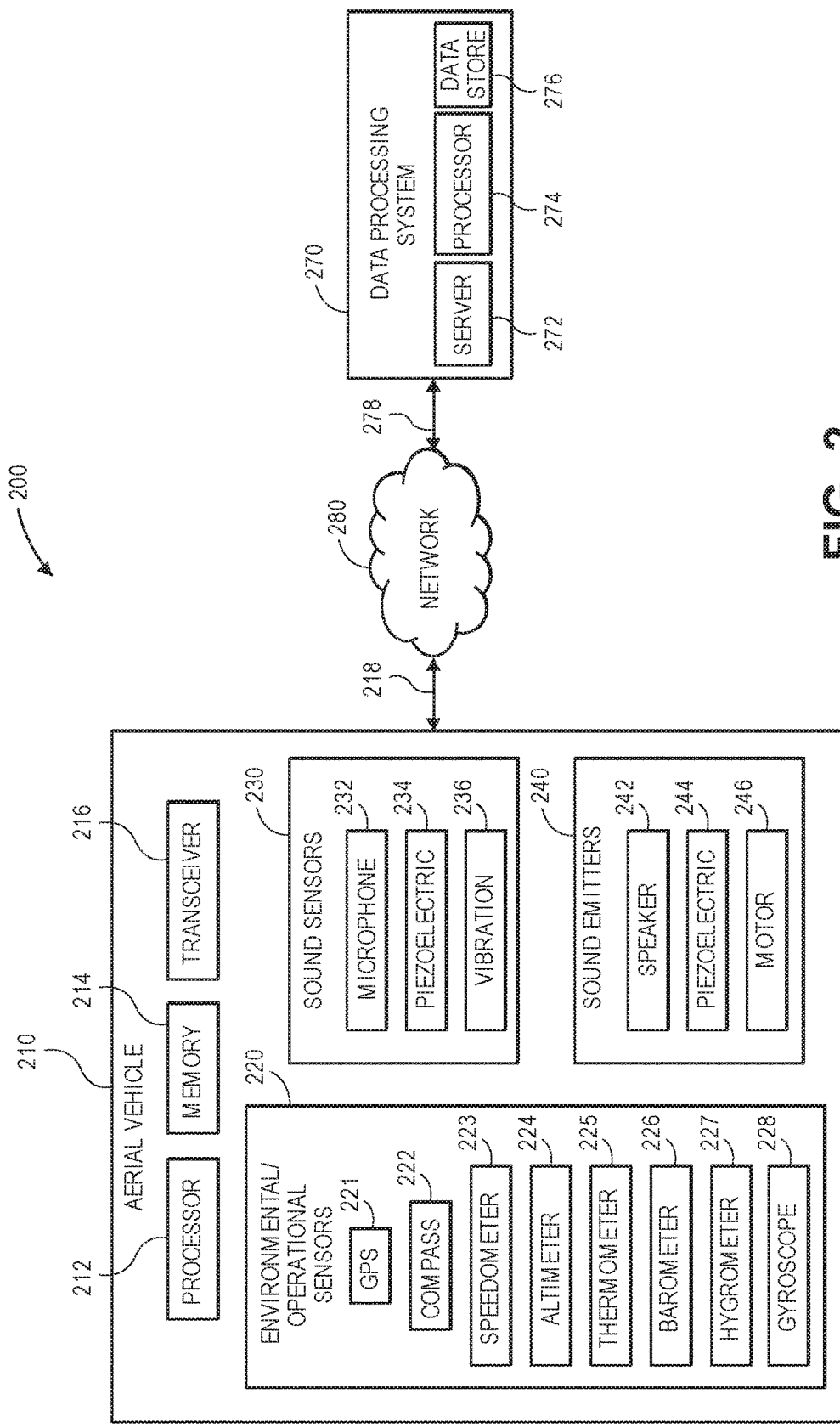
FIG. 2 is a block diagram of one system for active airborne noise abatement in accordance with embodiments of the present disclosure.

Referring to FIG. 2, a block diagram of components of one system 200 for active airborne noise abatement in accordance with embodiments of the present disclosure. The system 200 of FIG. 2 includes an aerial vehicle 210 and a data processing system 270 connected to one another over a network 280. Except where otherwise noted, reference numerals preceded by the number "2" shown in the block diagram of FIG. 2 indicate components or features that are similar to components or features having reference numerals preceded by the number "1" shown in the system 100 of FIGS. 1A through 1D.

The aerial vehicle 210 includes a processor 212, a memory or storage component 214 and a transceiver 216, as well as a plurality of environmental or operational sensors 220, a plurality of sound sensors 230 and a plurality of sound emitters 240.

The processor 212 may be configured to perform any type or form of computing function, including but not limited to the execution of one or more machine learning algorithms or techniques. For example, the processor 212 may control any aspects of the operation of the aerial vehicle 210 and the one or more computer-based components thereon, including but not limited to the transceiver 216, the environmental or operational sensors 220, the sound sensors 230, and/or the sound emitters 240. The aerial vehicle 210 may likewise include one or more control systems (not shown) that may generate instructions for conducting operations thereof, e.g., for operating one or more rotors, motors, rudders, ailerons, flaps or other components provided thereon. Such control systems may be associated with one or more other computing devices or machines, and may communicate with the data processing system 270 or one or more other computer devices (not shown) over the network 280, through the sending and receiving of digital data. The aerial vehicle 210 further includes one or more memory or storage components 214 for storing any type of information or data, e.g., instructions for operating the aerial vehicle, or information or data captured by one or more of the environmental or operational sensors 220, the sound sensors 230, and/or the sound emitters 240.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, such as over the network 280 or directly.

The environmental or operational sensors 220 may include any components or features for determining one or more attributes of an environment in which the aerial vehicle 210 is operating, or may be expected to operate, including extrinsic information or data or intrinsic information or data. As is shown in FIG. 2, the environmental or operational sensors 220 may include, but are not limited to, a Global Positioning System ("GPS") receiver or sensor 221, a compass 222, a speedometer 223, an altimeter 224, a thermometer 225, a barometer 226, a hygrometer 227, or a gyroscope 228. The GPS sensor 221 may be any device, component, system or instrument adapted to receive signals (e.g., trilateration data or information) relating to a position of the aerial vehicle 210 from one or more GPS satellites of a GPS network (not shown). The compass 222 may be any device, component, system, or instrument adapted to determine one or more directions with respect to a frame of reference that is fixed with respect to the surface of the Earth (e.g., a pole thereof). The speedometer 223 may be any device, component, system, or instrument for determining a speed or velocity of the aerial vehicle 210, and may include related components (not shown) such as pitot tubes, accelerometers, or other features for determining speeds, velocities, or accelerations.

The altimeter 224 may be any device, component, system, or instrument for determining an altitude of the aerial vehicle 210, and may include any number of barometers, transmitters, receivers, range finders (e.g., laser or radar) or other features for determining heights. The thermometer 225, the barometer 226 and the hygrometer 227 may be any devices, components, systems, or instruments for determining local air temperatures, atmospheric pressures, or humidities within a vicinity of the aerial vehicle 210. The gyroscope 228 may be any mechanical or electrical device, component, system, or instrument for determining an orientation, e.g., the orientation of the aerial vehicle 210. For example, the gyroscope 228 may be a traditional mechanical gyroscope having at least a pair of gimbals and a flywheel or rotor. Alternatively, the gyroscope 228 may be an electrical component such a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle 210.

Those of ordinary skill in the pertinent arts will recognize that the environmental or operational sensors 220 may include any type or form of device or component for determining an environmental condition within a vicinity of the aerial vehicle 210 in accordance with the present disclosure. For example, the environmental or operational sensors 220 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges, accelerometers or the like, as well as one or more imaging devices (e.g., digital cameras), and are not limited to the sensors 221, 222, 223, 224, 225, 226, 227, 228 shown in FIG. 2.

The sound sensors 230 may include other components or features for detecting and capturing sound energy in a vicinity of an environment in which the aerial vehicle 210 is operating, or may be expected to operate. As is shown in FIG. 2, the sound sensors 230 may include a microphone 232, a piezoelectric sensor 234, and a vibration sensor 236. The microphone 232 may be any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy. The microphone 232 may also be provided as a discrete component, or in combination with one or more other components, e.g., an imaging device such as a digital camera. Furthermore, the microphone 232 may be configured to detect and record acoustic energy from any and all directions.

The piezoelectric sensor 234 may be configured to convert changes in pressure, including but not limited to such pressure changes that are initiated by the presence of acoustic energy across various bands of frequencies, to electrical signals, and may include one or more crystals, electrodes or other features. The vibration sensor 236 may be any device configured to detect vibrations of one or more components of the aerial vehicle 210, and may also be a piezoelectric device. For example, the vibration sensor 236 may include one or more accelerometers, e.g., an application-specific integrated circuit and one or more microelectromechanical sensors in a land grid array package, that are configured to sense differential accelerations along one or more axes over predetermined periods of time and to associate such accelerations with levels of vibration and, therefore, sound.

The sound emitters 240 may further include other components or features mounted to or provided on the aerial vehicle 210 for emitting sound signals at any intensity or at one or more frequencies. As is shown in FIG. 2, the sound emitters 240 may include one or more speakers 242, a piezoelectric emitter 244, or a vibration emitter 246. The speaker 242 may be any type or form of transducer for converting electrical signals into sound energy. The speaker 242 may have any degree of technical complexity, and may be, for example, an electrodynamic speaker, an electrostatic speaker, a flat-diaphragm speaker, a magnetostatic speaker, a magnetostrictive speaker, a ribbon-driven speaker, a planar speaker, a plasma arc speaker, or any other type or form of speaker. Alternatively, the speaker 242 may be basic or primitive, such as a PC speaker, e.g., an audio speaker having a limited bit range or capacity. Additionally, the speaker 242 may be a single speaker adapted to emit sounds over a wide range of frequency, or may include one or more components (e.g., tweeters, mid-ranges, and woofers) for emitting sounds over wide ranges of frequencies. A piezoelectric emitter 244 may be a sound emitter having an expanding or contracting crystal that vibrates in air or another medium in order to produce sounds. In some embodiments, the piezoelectric emitter 244 may also be the piezoelectric sensor 234. A vibration emitter 246 may be any type or form of device configured to cause one or more elements of the aerial vehicle 210 to vibrate at a predetermined resonance frequency.

The data processing system 270 includes one or more physical computer servers 272 having one or more computer processors 274 and a plurality of data stores 276 associated therewith, which may be provided for any specific or general purpose. For example, the data processing system 270 of FIG. 2 may be independently provided for the exclusive purpose of receiving, analyzing or storing acoustic signals or other information or data received from the aerial vehicle 210 or, alternatively, provided in connection with one or more physical or virtual services configured to receive, analyze or store such acoustic signals, information or data, as well as one or more other functions. The servers 272 may be connected to or otherwise communicate with the processors 274 and the data stores 276. The data stores 276 may store any type of information or data, including but not limited to acoustic signals, information or data relating to acoustic signals, or information or data regarding environmental conditions, operational characteristics, or positions, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., media files received from the aerial vehicle 210, or from one another, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more aerial vehicles, including but not limited to the aerial vehicle 210.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 210 may be adapted to transmit information or data in the form of synchronous or asynchronous messages to the data processing system 270 or to any other computer device in real time or in near-real time, or in one or more offline processes, via the network 280. Those of ordinary skill in the pertinent art would recognize that the aerial vehicle 210 or the data processing system 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212 or the processor 274, or any other computers or control systems utilized by the aerial vehicle 210 or the data processing system 270, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
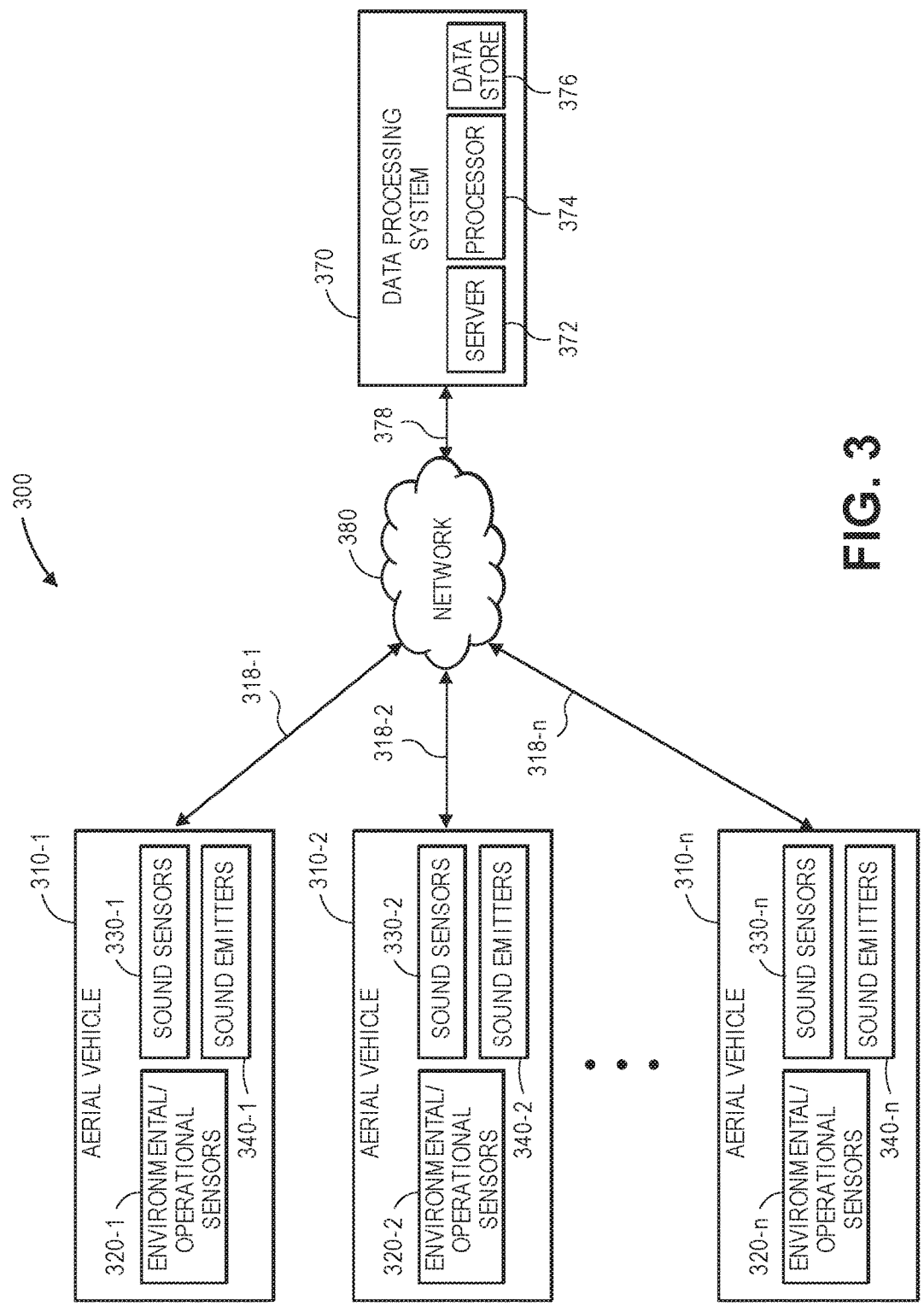
FIG. 3 is a block diagram of one system for active airborne noise abatement in accordance with embodiments of the present disclosure.

As is discussed above, information or data regarding not only acoustic energies but also environmental conditions, operational characteristics or positions may be received from any number of aerial vehicles, and subsequently provided to a data processing system for evaluation and analysis according to one or more machine learning algorithms or techniques. Referring to FIG. 3, a block diagram of components of one system 300 for active airborne noise abatement in accordance with embodiments of the present disclosure. The system 300 of FIG. 3 includes n aerial vehicles 310-1, 310-2 . . . 310-$n$ and a data processing system 370 connected to one another over a network 380. Except where otherwise noted, reference numerals preceded by the number "3" shown in the block diagram of FIG. 3 indicate components or features that are similar to components or features having reference numerals preceded by the number "2" shown in the block diagram of FIG. 2 or by the number "1" shown in the system of FIGS. 1A through 1D.

As is shown in FIG. 3, the system 300 includes a plurality of n aerial vehicles 310-1, 310-2 . . . 310-$n$, each having one or more environmental or operational sensors 320-1, 320-2 . . . 320-$n$, sound sensors 330-1, 330-2 . . . 330-$n$ and sound emitters 340-1, 340-2 . . . 340-$n$. Thus, in operation, each of the aerial vehicles 310-1, 310-2 . . . 310-$n$ may be configured to capture information or data regarding their environmental conditions, operational characteristics or positions, as well as acoustic energies encountered by such aerial vehicles 310-1, 310-2 . . . 310-$n$, using one or more of the environmental or operational sensors 320-1, 320-2 . . . 320-$n$ or the sound sensors 330-1, 330-2 . . . 330-$n$ and to transmit such information to the data processing system 370 over the network 380. Each of the aerial vehicles 310-1, 310-2 . . . 310-$n$ may further include one or more other computer components (not shown), such as one or more of the processors 212, the memory components 214 or the transceivers 216 of the aerial vehicle 210 shown in FIG. 2.

The data processing system 370 may operate one or more machine learning systems (e.g., algorithms or techniques) for associating the information or data captured using the environmental or operational sensors 320-1, 320-2 . . . 320-$n$ of the various aerial vehicles 310-1, 310-2 . . . 310-$n$ with the noises captured using the sound sensors 330-1, 330-2 . . . 330-$n$. Likewise, each of the aerial vehicles 310-1, 310-2 . . . 310-$n$ may be configured to emit anti-noises identified by the data processing system 370 using one or more of the sound emitters 340-1, 340-2 . . . 340-$n$. Machine learning systems operated by the data processing system 370 may thus be trained or refined in real time, or in near-real time, based on information or data captured by the aerial vehicles 310-1, 310-2 . . . 310-$n$. In some embodiments, such machine learning systems may also provide information regarding predicted noises that may be generated or encountered, and anti-noises for counteracting the effects of one or more of the predicted noises, to one or more of the aerial vehicles 310-1, 310-2 . . . 310-$n$, also in real time or in near-real time.

As is discussed above, in some embodiments, the data processing system 370 may be provided a physical location, or in one or more alternate or virtual locations, e.g., in a "cloud"-based environment. In still other embodiments, the data processing system 370 may be provided onboard one or more of the aerial vehicles 310-1, 310-2 . . . 310-*n*. For example, one or more of the aerial vehicles 310-1, 310-2 . . . 310-*n* may be configured to autonomously capture data on behalf of a machine learning system operating thereon, train the machine learning system, e.g., to define a sound model thereon, and to predict sound pressure levels or intensities and frequencies that are expected to be generated or encountered by one or more of the aerial vehicles 310-1, 310-2 . . . 310-*n*, as well as to identify and emit one or more anti-noises, e.g., sounds having substantially identical intensities or pressure levels and frequencies that are out-of-phase with the anticipated sounds.

Alternatively, in some other embodiments, at least one of the one or more of the aerial vehicles 310-1, 310-2 . . . 310-*n* may be designated as a "master" aerial vehicle for the purpose of predicting sound pressure levels or intensities and frequencies that are expected to be generated or encountered by each of the other aerial vehicles 310-1, 310-2 . . . 310-*n* during operation, and may communicate information or data regarding the predicted sound pressure levels or intensities and frequencies to be generated or encountered thereby to the one or more of the aerial vehicles 310-1, 310-2 . . . 310-*n*.

Figure 4:
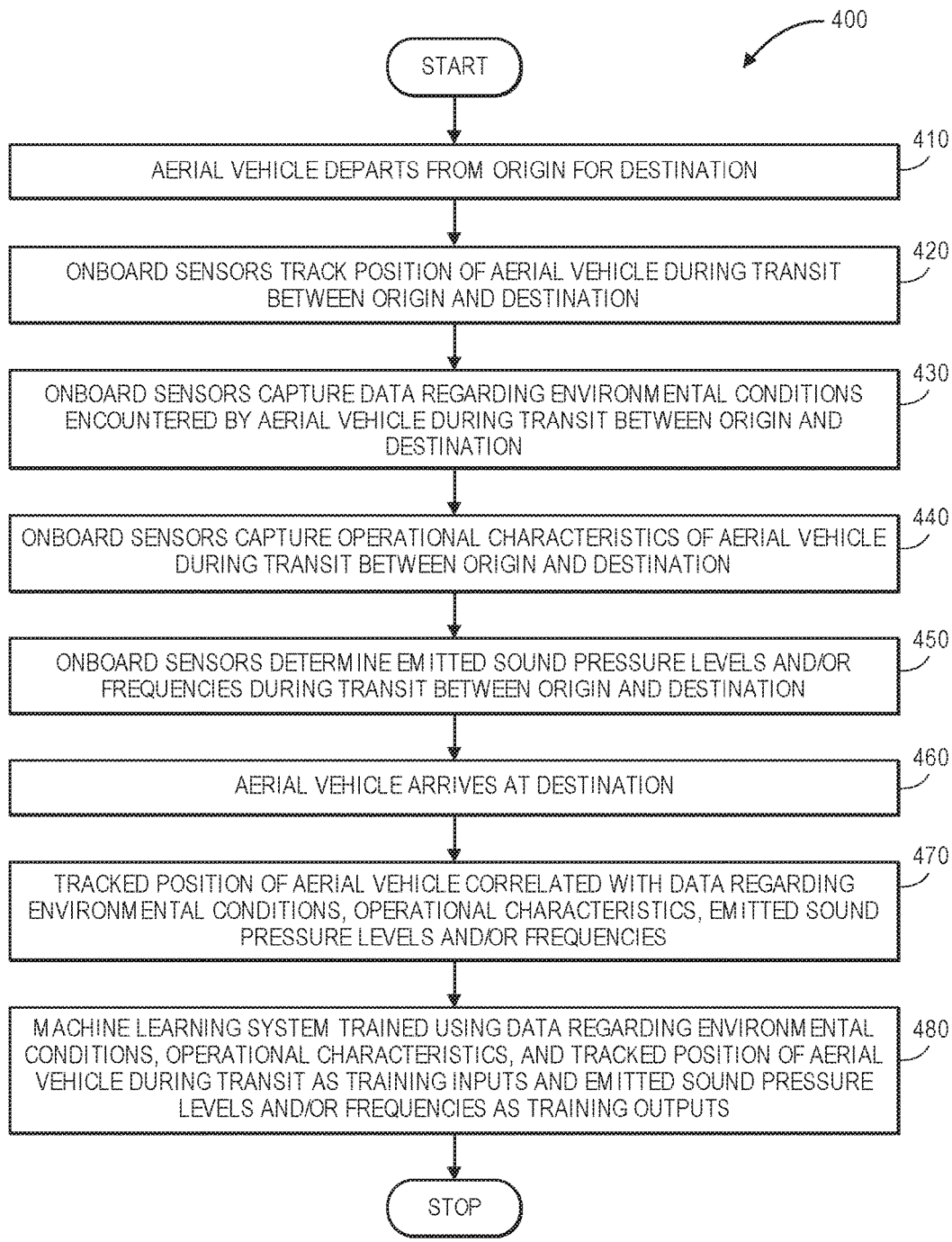
FIG. 4 is a flow chart of one process for active airborne noise abatement in accordance with embodiments of the present disclosure.

Referring to FIG. 4, a flow chart 400 of one process for active airborne noise abatement in accordance with embodiments of the present disclosure is shown. At box 410, an aerial vehicle departs from an origin for a destination. The aerial vehicle may be manually instructed or automatically programmed to travel to the destination for any purpose, including but not limited to delivering an item from the origin to the destination. Alternatively, the aerial vehicle may travel to the destination for the express purpose of capturing information or data regarding environmental conditions, operational characteristics, or acoustic energies at the origin, the destination, or at any intervening waypoints, and correlating such environmental conditions, operational characteristics or acoustic energies with locations of the aerial vehicle.

At box 420, one or more sensors onboard the aerial vehicle track its position during the transit between the origin and the destination. For example, the aerial vehicle may include one or more GPS sensors, gyroscopes, accelerometers or other components for tracking a location of the aerial vehicle in two-dimensional or three-dimensional space while the vehicle is en route from the origin to the destination. The positions of the aerial vehicle may be determined continuously, at various intervals of time, based on altitudes, courses, speeds, climb or descent rates, turn rates, or accelerations, or on any other basis. At box 430, one or more other sensors determine one or more environmental conditions encountered by the aerial vehicle, e.g., temperatures, barometric pressures, humidities, wind speeds, or levels of precipitation, while at box 440, one or more other sensors determine operational characteristics of the aerial vehicle while the aerial vehicle is in transit, e.g., motor rotating speeds, propeller rotating speeds, altitudes, courses, speeds, climb or descent rates, turn rates or accelerations of the aerial vehicle. At box 450, one or more other onboard sensors (e.g., one or more microphones or other sound sensors) determine emitted sound pressure levels and/or frequencies during the transit of the aerial vehicle between the origin and the destination.

At box 460, the aerial vehicle arrives at the destination. At box 470, the tracked positions of the aerial vehicle are correlated with data regarding the environmental conditions, the operational characteristics, or the emitted sound pressure levels. For example, when the positions of the aerial vehicle are captured, e.g., at box 420, and when information or data regarding such environmental conditions, operational characteristics or emitted sound pressure levels are captured, e.g., at boxes 430, 440 and 450, the information or data may be time-stamped or marked with one or more identifiers, and subsequently correlated based on the times at which the various information or data was captured. Alternatively, the information or data regarding such environmental conditions, operational characteristics or emitted sound pressure levels may be stamped or marked with position information (e.g., latitudes or longitudes) as the information or data is captured.

At box 480, a machine learning system is trained using data regarding the environmental conditions, operational characteristics, tracked positions as training inputs, and the emitted sound pressure levels and/or frequencies as training outputs, and the process ends. For example, the machine learning system may be trained to associate such data with emitted sound pressure levels according to any manual or automatic means, including one or more machine algorithms or techniques such as nearest neighbor methods or analyses, factorization methods or techniques, K-means clustering analyses or techniques, similarity measures such as log likelihood similarities or cosine similarities, latent Dirichlet allocations or other topic models, or latent semantic analyses. The machine learning system may thus result in a sound model configured to identify a predicted noise, e.g., a sound pressure level or intensity and frequency of a sound that may be expected to be generated or encountered during the operation of an aerial vehicle in a given environmental conditions, at given operating characteristics or at given positions. The machine learning system may be further trained to determine confidence levels, probabilities, or likelihoods that the sound pressure level or intensity and frequency will be generated or encountered within such environmental conditions or operational characteristic, or at the tracked positions. In some embodiments, the machine learning system may reside and/or be operated on one or more centrally located computing devices or machines, or in alternate or virtual locations, e.g., a "cloud"-based environment. In some other embodiments, the machine learning system being trained may reside and/or be operated on one or more computing devices or machines provided onboard one or more aerial vehicles from which the data regarding the environmental conditions or the operational characteristics were captured and on which the emitted sound pressure levels and/or frequencies were determined.

Figure 5:
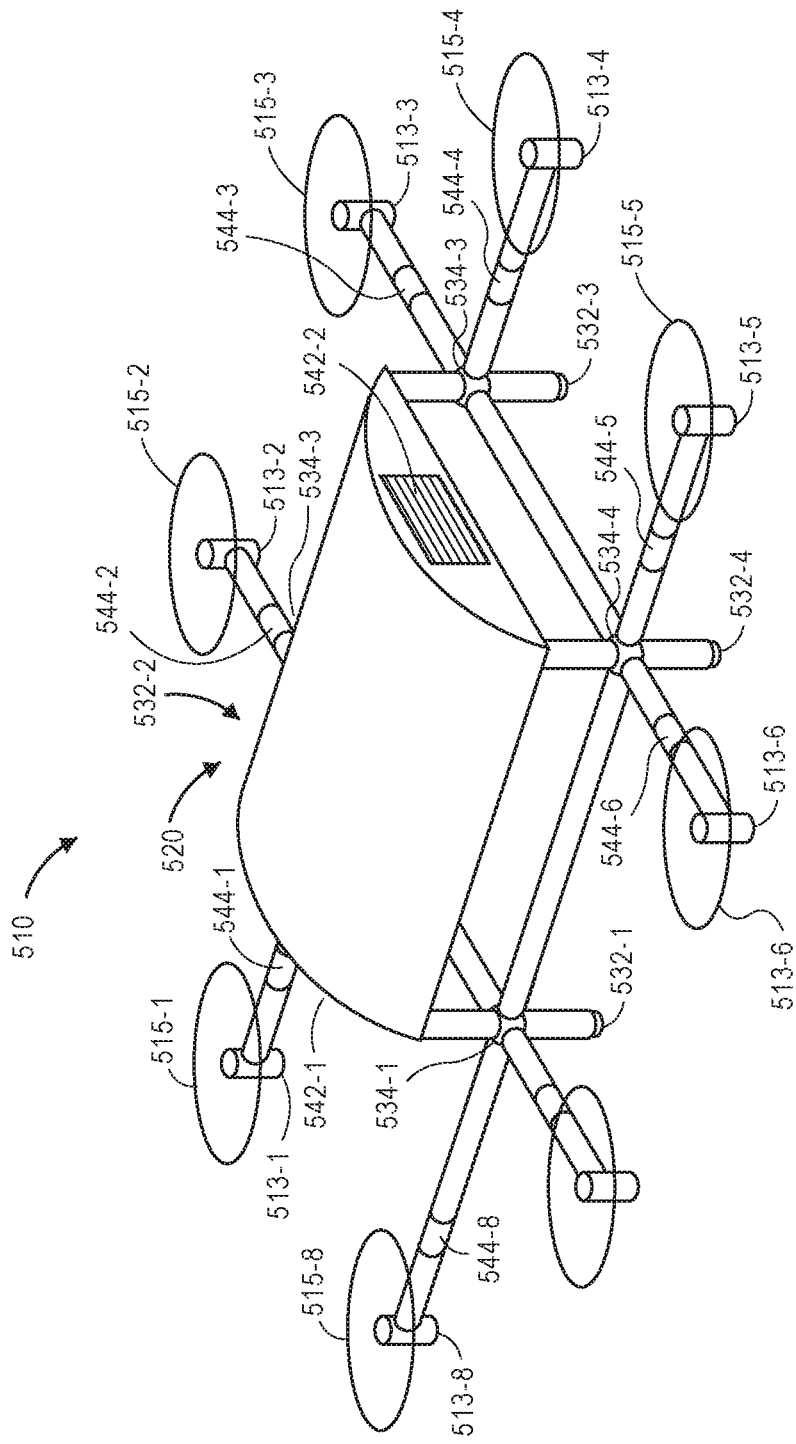
FIG. 5 is a view of one aerial vehicle configured for active airborne noise abatement in accordance with embodiments of the present disclosure.

Aerial vehicles may include any number of environmental or operational sensors, noise sensors, noise emitters, and other components for capturing extrinsic or intrinsic information or data in accordance with the present disclosure. Referring to FIG. 5, a view of one aerial vehicle 510 configured for active airborne noise abatement in accordance with embodiments of the present disclosure is shown. Except where otherwise noted, reference numerals preceded by the number "5" shown in FIG. 5 indicate components or features that are similar to components or features having reference numerals preceded by the number "3" shown in FIG. 3, by the number "2" shown in FIG. 2 or by the number "1" shown in FIGS. 1A through 1D.

The aerial vehicle 510 is an octo-copter including eight motors 513-1, 513-2, 513-3, 513-4, 513-5, 513-6, 513-7, and 513-8 and eight propellers 515-1, 515-2, 515-3, 515-4, 515-5, 515-6, 515-7, and 515-8. The aerial vehicle 510 also includes a plurality of environmental sensors 520, e.g., sensors of position, orientation, speed, altitude, temperature, pressure, humidity or other conditions or attributes (not shown). The aerial vehicle 510 further includes sensors for detecting emitted sound pressure levels onboard the aerial vehicle 510, including four microphones 532-1, 532-2, 532-3, 532-4 mounted to an airframe of the aerial vehicle 510, and four piezoelectric sensors 534-1, 534-2, 534-3, 534-4 provided at intersections of components of the airframe, e.g., for detecting vibration of the airframe during operations. The aerial vehicle 510 also includes devices for emitting sounds such as a pair of speakers 542-1, 542-2 provided on either side of the aerial vehicle 510, and eight piezoelectric sound emitters 544-1, 544-2, 544-3, 544-4, 544-5, 544-6, 544-7, 544-8 mounted to components of the airframe. The aerial vehicle 510 may further include additional sound emitting devices (not shown), e.g., PC speakers, provided in discrete locations on the aerial vehicle 510. The speakers 542-1, 542-2, the sound emitters 544-1, 544-2, 544-3, 544-4, 544-5, 544-6, 544-7, 544-8 or any other sound-emitting components may be configured to emit anti-noise based on noise that may be predicted to be encountered by the aerial vehicle 510.

Figure 6:
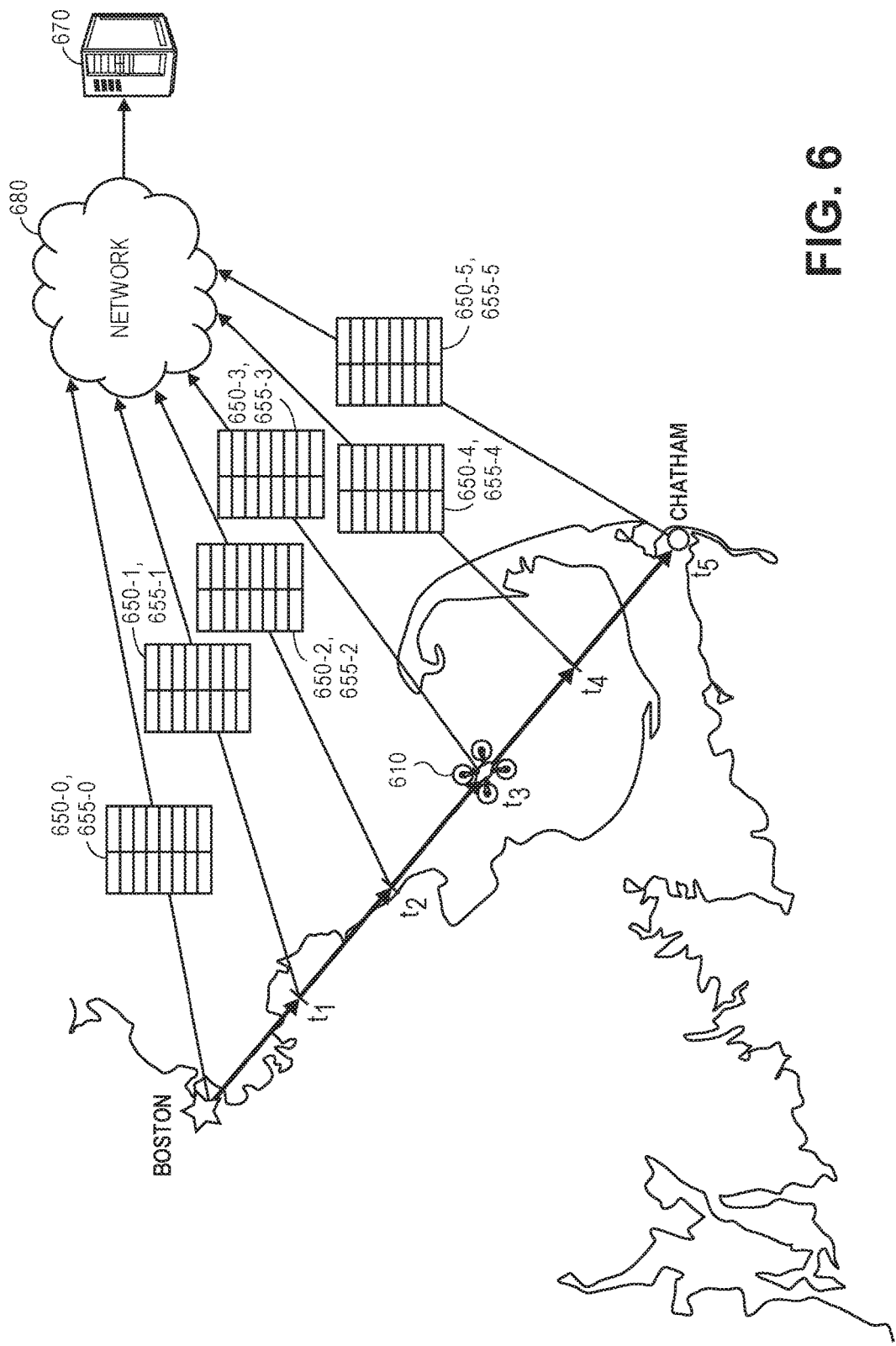
FIG. 6 is a view of aspects of one system for active airborne noise abatement in accordance with embodiments of the present disclosure.

As is discussed above, information or data regarding environmental conditions, operational characteristics or positions determined during a transit of an aerial vehicle, and emitted sound pressure levels recorded during the transit of the aerial vehicle, may be captured and provided to a machine learning system in real time or in near-real time during the transit, at regular or irregular intervals (e.g., over a wired or wireless network connection), or when the transit is complete. Referring to FIG. 6, a view of aspects of one system 600 for active airborne noise abatement in accordance with embodiments of the present disclosure is shown. Except where otherwise noted, reference numerals preceded by the number "6" shown in FIG. 6 indicate components or features that are similar to components or features having reference numerals preceded by the number "5" shown in FIG. 5, by the number "3" shown in FIG. 3, by the number "2" shown in FIG. 2 or by the number "1" shown in FIGS. 1A through 1D.

As is shown in FIG. 6, an aerial vehicle 610 is shown en route between Boston, Mass., and Chatham, Mass. At regular intervals of time or position, e.g., prior to departure from the origin, at times t1, t2, t3, t4 while in transit, and upon an arrival at the destination, information or data 650-0, 650-1, 650-2, 650-3, 650-4, 650-5 regarding the operation of the aerial vehicle 610 or the environmental conditions in which the aerial vehicle 610 operates, e.g., locations, altitudes, courses, speeds, climb or descent rates, turn rates, accelerations, wind velocities, humidity levels or temperatures, may be captured and stored and/or transmitted to a machine learning system 670 (e.g., upon an arrival of the aerial vehicle 610 at the destination). Likewise, information or data regarding noise levels 655-0-, 655-1, 655-2, 655-3, 655-4, 655-5 captured by sensors onboard the aerial vehicle 610 may also be stored or transmitted to the machine learning system 670. Subsequently, the machine learning system 670 may be trained using the information or data 650-0, 650-1, 650-2, 650-3, 650-4, 650-5 as training inputs, and the noise levels 655-0-, 655-1, 655-2, 655-3, 655-4, 655-5 as training outputs, to recognize and associate environmental conditions, operational characteristics or positions with emitted sound pressure levels. The machine learning system 670 may further be trained to determine a confidence interval (or a confidence level or another measure or metric of a probability or likelihood) that emitted sound pressure levels will be generated or encountered by an aerial vehicle in a given environment that is subject to given operational characteristics at a given position.

Thereafter, when information regarding a planned transit of an aerial vehicle, e.g., the aerial vehicle 610 or another aerial vehicle having one or more attributes in common with the aerial vehicle 610, is determined, such information or data may be provided to the trained machine learning system 670 as an input, and an emitted sound pressure level or intensity and a frequency anticipated during the planned transit may be determined based on an output from the trained machine learning system 670. Additionally, as is discussed above, a confidence interval may be determined and associated with the emitted sound pressure level or intensity and the frequency. An anti-noise to be emitted by the aerial vehicle 610, e.g., continuously during the transit, or at various intervals, may be determined based on the anticipated emitted sound pressure level or intensity and frequency. Moreover, during the actual transit of the aerial vehicle, information or data regarding actual environmental conditions, operating characteristics and/or acoustic energies may be captured in real time or near-real time and utilized to determine one or more anti-noises to be emitted by the aerial vehicle 610 in transit, e.g., using a sound model trained to return a predicted sound based on inputs in accordance with the Nyquist frequency.

Figure 7:
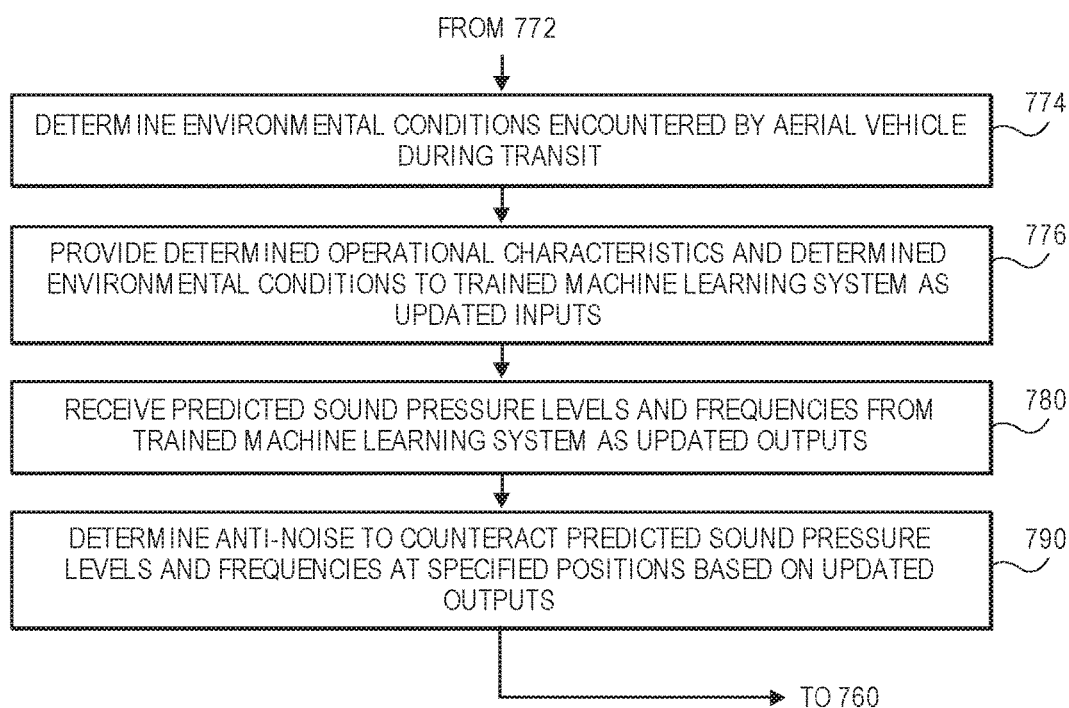
FIG. 7 is a flow chart of one process for active airborne noise abatement in accordance with embodiments of the present disclosure.

Referring to FIG. 7, a flow chart 700 of one process for active airborne noise abatement in accordance with embodiments of the present disclosure is shown. At box 710, a destination of an aerial vehicle is determined, and at box 720, a transit plan for the aerial vehicle for a transit of the aerial vehicle from an origin to the destination is identified. For example, the transit plan may specify an estimated time of departure from the origin, locations of any waypoints between the origin or the destination, a desired time of arrival at the destination, or any other relevant geographic or time constraints associated with the transit. At box 722, operational characteristics of the aerial vehicle that are required in order to complete the transit from the origin to the destination in accordance with the transit plan, e.g., courses or speeds of the aerial vehicle, and corresponding instructions to be provided to such motors, rotors, rudders, ailerons, flaps or other features of the aerial vehicle in order to achieve such courses or speeds, may be predicted. At box 724, environmental conditions may be expected to be encountered during the transit from the origin to the destination in accordance with the transit plan are predicted. For example, weather forecasts for the times or dates of the departure or the arrival of the aerial vehicle, and for the locations of the origin or the destination, may be identified on any basis.

At box 726, the transit plan identified at box 720, the predicted operational characteristics determined at box 722 and the predicted environmental conditions predicted at box 724 are provided to a trained machine learning system as initial inputs. The machine learning system may utilize one or more algorithms or techniques such as nearest neighbor methods or analyses, factorization methods or techniques, K-means clustering analyses or techniques, similarity measures such as log likelihood similarities or cosine similarities, latent Dirichlet allocations or other topic models, or latent semantic analyses, and may be trained to associate environmental, operational or location-based information with emitted sound pressure levels. In some embodiments, the trained machine learning system resides and/or operates on one or more computing devices or machines provided onboard the aerial vehicle. In some other embodiments, the trained machine learning system resides in one or more alternate or virtual locations, e.g., in a "cloud"-based environment accessible via a network.

At box 730, one or more predicted sound pressure levels or frequencies are received from the machine learning system as outputs. Such sound pressure levels or frequencies may be average or general sound pressure levels anticipated for the entire transit of the aerial vehicle from the origin to the destination in accordance with the transit plan, or may change or vary based on the predicted location of the aerial vehicle, or a time between the departure of the aerial vehicle from the origin and an arrival of the aerial vehicle at the destination. Alternatively, or additionally, the machine learning system may also determine a confidence interval, a confidence level or another measure or metric of a probability or likelihood that the predicted sound pressure levels or frequencies will be generated or encountered by an aerial vehicle in a given environment that is subject to given operational characteristics at a given position.

At box 740, anti-noise intended to counteract the predicted sound pressure levels and frequencies at specified positions is determined based on the initial outputs. For example, where the sounds that the aerial vehicle may be expected to generate or encounter include narrowband sound energy having specific intensities that are centered around discrete frequencies at a given location, anti-noise having the specific intensities and the discrete frequencies that is one hundred eighty degrees out-of-phase with the expected sounds (or of a reverse polarity with respect to the expected sounds) may be determined. The anti-noise may be a constant sound to be emitted at or within a vicinity of the given location in accordance with the transit plan, or may include different sounds to be emitted at different times or intervals during the transit. In some embodiments, anti-noise need not be emitted where the aerial vehicle will not pass within earshot of any humans or other animals, e.g., when no such humans or animals are within a vicinity of the aerial vehicle, or where distances between the aerial vehicle and such humans or animals are sufficiently large. In some other embodiments, anti-noise need not be emitted where the expected sounds of the aerial vehicle are insignificant compared to ambient noise within the environment, e.g., where a signal-to-noise ratio is sufficiently low, as the expected sounds of the aerial vehicle will not likely be heard. In other embodiments, the anti-noise may be intended to address all of the sounds emitted by the aerial vehicle, while in some other embodiments, the anti-noise may be intended to reduce the net effects of such sounds to below a predetermined threshold.

At box 750, the aerial vehicle departs from the origin to the destination, and at box 760, anti-noise is emitted at specific positions during the transit from the origin to the destination. For example, the aerial vehicle may monitor its position during the transit using one or more GPS receiver or sensors and emit a discrete anti-noise, or one or more anti-noises, at or between such specific positions during the transit. At box 770, whether the aerial vehicle has arrived at the destination is determined. If the aerial vehicle has arrived at the destination, then the process ends.

If the aerial vehicle has not yet arrived at the destination, however, then the process advances to box 772, where actual operational characteristics of the aerial vehicle during the transit are determined. For example, information or data regarding the actual courses or speeds of the aerial vehicle, and the operational actions, events or instructions that caused the aerial vehicle to achieve such courses or speeds, may be captured and recorded in at least one data store, which may be provided onboard the aerial vehicle, or in one or more alternate or virtual locations, e.g., in a "cloud"-based environment accessible via a network. At box 774, environmental conditions encountered by the aerial vehicle during the transit are determined. For example, information or data regarding the actual wind velocities, humidity levels, temperatures, precipitation or any other environmental events or statuses within the vicinity of the aerial vehicle may also be captured and recorded in at least one data store.

At box 776, information or data regarding the operational characteristics determined at box 772 and the environmental conditions determined at box 774 are provided to the trained machine learning system as updated inputs, in real time or in near-real time. In some embodiments, values corresponding to the operational characteristics or environmental conditions are provided to the trained machine learning system. In some other embodiments, values corresponding to differences or differentials between the operational characteristics determined that were determined at box 772 or the environmental conditions that were determined at box 774 and the operational characteristics that were predicted at box 722, or the environmental conditions that were predicted at box 724, may be provided to the trained machine learning system.

At box 780, predicted sound pressure levels and frequencies are received from the trained machine learning system as updated outputs. As is discussed above, noises that are to be generated or encountered by an aerial vehicle may be predicted in accordance with a transit plan for the aerial vehicle, and anti-noises determined based on such predicted noises may be determined based on the transit plan, as well as any other relevant information or data regarding the transit plan, including attributes of an origin, a destination or any intervening waypoints, such as locations, topography, population densities or other criteria. For example, the emission of anti-noise may be halted in order to conserve electric power on onboard sources (e.g., batteries), particularly where the predicted noises are of no consequence or where the anti-noise will have no measurable effect. At box 790, anti-noises for counteracting the predicted sound pressure levels and frequencies received from the trained machine learning system based on the updated outputs are determined before the process returns to box 760, where such anti-noises are emitted at specified positions.

Figure 8A:
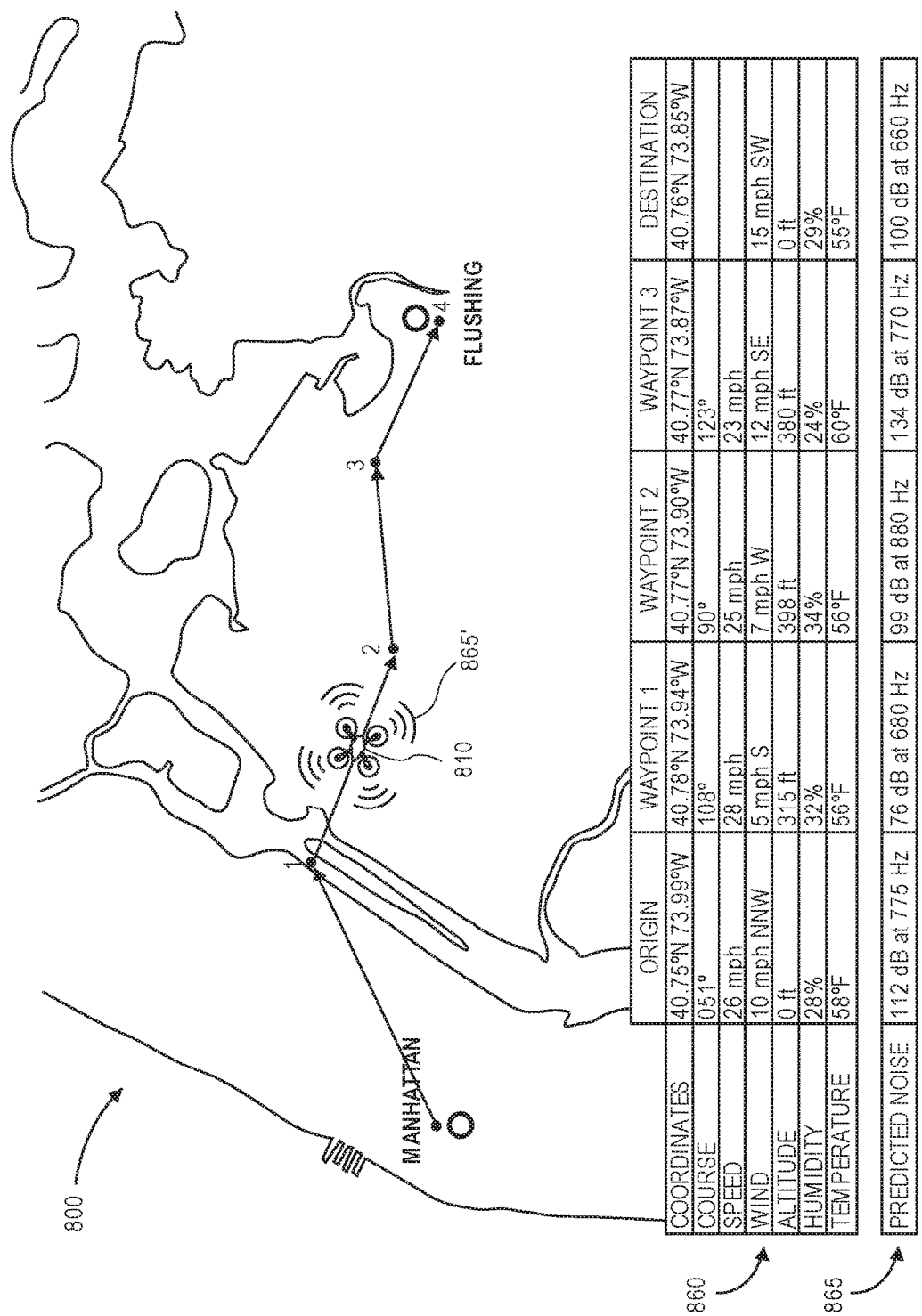
FIG. 8A and FIG. 8B are views of aspects of one system for active airborne noise abatement in accordance with embodiments of the present disclosure.
Figure 8B:
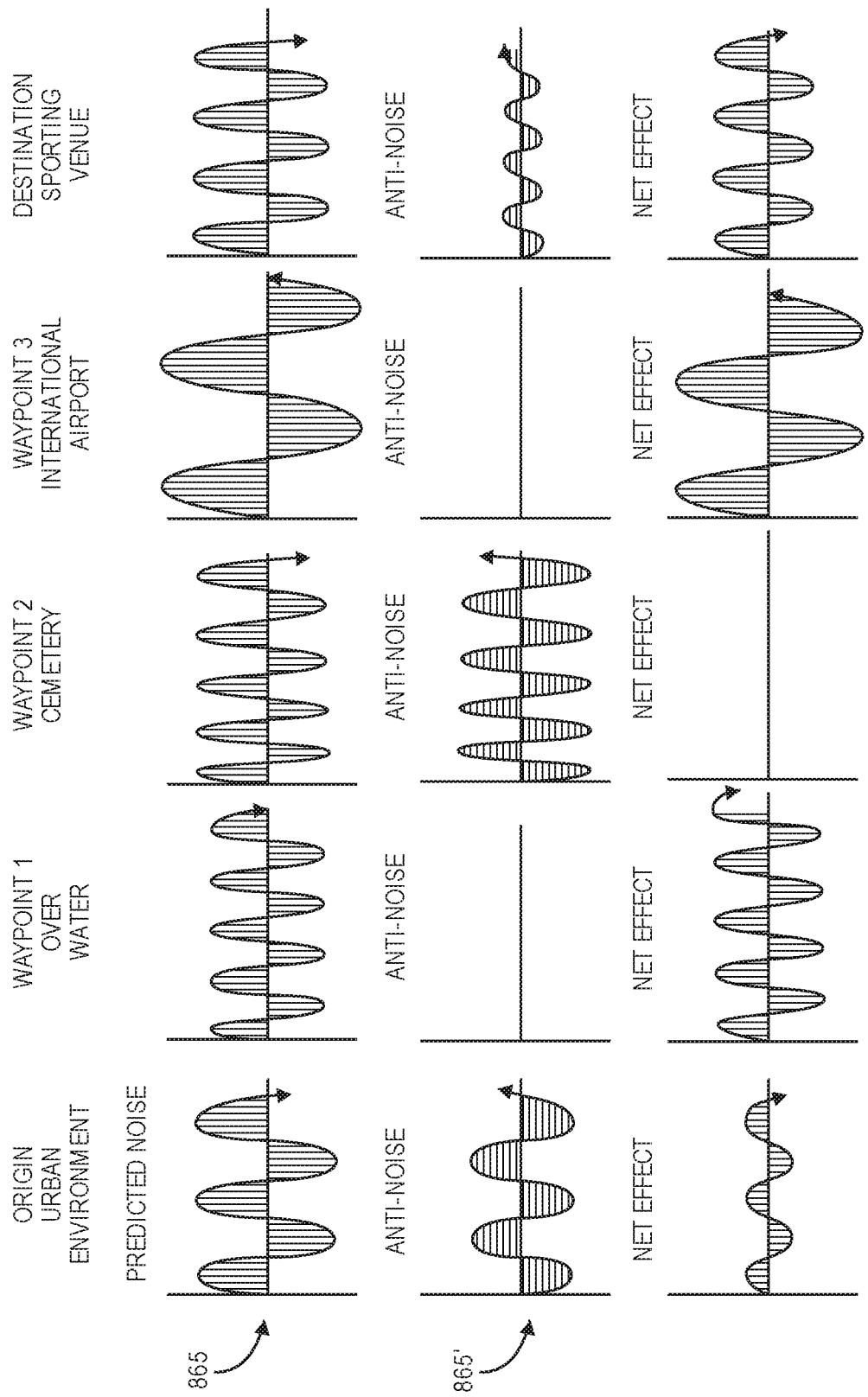

Referring to FIGS. 8A and 8B, views of aspects of one system 800 for active airborne noise abatement in accordance with embodiments of the present disclosure are shown. Except where otherwise noted, reference numerals preceded by the number "8" shown in FIG. 8A or FIG. 8B indicate components or features that are similar to components or features having reference numerals preceded by the number "6" shown in FIG. 6, by the number "5" shown in FIG. 5, by the number "3" shown in FIG. 3, by the number "2" shown in FIG. 2 or by the number "1" shown in FIGS. 1A through 1D.

As is shown in FIG. 8A, a transit plan 860 of an aerial vehicle 810 traveling between Manhattan, N.Y., and Flushing, N.Y., is shown. The transit plan 860 identifies information or data regarding an origin, a destination, and three intervening waypoints, e.g., coordinates, altitudes, courses, speeds, climb or descent rates, turn rates, accelerations, winds, humidities and temperatures. Using the transit plan 860, information or data regarding predicted noise 865 may be determined, e.g., based on an output received from a machine learning system after the transit plan 860 is provided thereto as an input.

In accordance with the present disclosure, anti-noise 865' may be identified based on the predicted noise 865, and emitted from the aerial vehicle 810 using one or more sound emitters. For example, as is shown in FIG. 8B, where the origin is located in an urban environment, anti-noise 865' having amplitudes less than the amplitudes of the predicted noise 865, and frequencies that are one hundred eighty degrees out-of-phase, may be emitted from the aerial vehicle 810 within a vicinity of the origin. The anti-noise 865' is thus intended to reduce, e.g., below an acceptable level or threshold, but not eliminate, intensities of the predicted noise 865 within a vicinity of the aerial vehicle 810 at the origin, which is characterized by the presence of occasionally high levels of ambient noise within the urban environment.

Conversely, where a first waypoint is located over water, anti-noise 865' need not be emitted from the aerial vehicle 810, as the aerial vehicle 810 is not expected to encounter humans or other animals that may be adversely affected by the emission of the predicted noise 865 from the aerial vehicle 810. Where a second waypoint is located over a cemetery, or other location subject to strict noise limits or thresholds that may be formal or informal in nature, anti-noise 865' that is equal in amplitude to the predicted noise 865 may be emitted from the aerial vehicle 810, at a frequency that is one hundred eighty degrees out-of-phase with the frequency of the predicted noise 865.

Where a third waypoint is located within a vicinity of an international airport, e.g., a location having characteristically high ambient noise levels, anti-noise 865' need not be emitted from the aerial vehicle 810, as the predicted noise 865 within a vicinity of the third waypoint may have intensities that are far below the ambient noise levels, or energies that are centered at or near frequencies that have high ambient noise levels associated therewith. Finally, where the destination is located within a vicinity of a sporting venue, where high intensity noise may be commonly accepted by fans or other personnel at the sporting venue, anti-noise which slightly reduces but need not necessarily eliminate the net effect of such noises may be emitted, thereby conserving the electrical power available onboard.

As is discussed above, a sound model provided by a trained machine learning system may identify two or more noises having discrete sound pressure levels or intensities and frequencies that may be predicted to be generated or encountered by an aerial vehicle during operations. The predicted noises may be identified in advance of the operations, or in real time or near-real time as the operations are in progress. In response, the aerial vehicle may emit two or more anti-noises in order to counteract the effects of the predicted noises. The two or more anti-noises may be emitted simultaneously, and at the sound pressure levels or intensities and frequencies corresponding to the predicted noises. Alternatively, the two or more anti-noises may be emitted at sound pressure levels or intensities and frequencies according to a weighted wave superposition, e.g., such that the two or more anti-noises may constructively or destructively interfere with one another in a predetermined manner. In some embodiments, one of the anti-noises may be a predicted anti-noise for an aerial vehicle that is in transit, while another of the anti-noises may be determined in response to noises of the aerial vehicle that are actually observed while the aerial vehicle is in transit.

Figure 9:
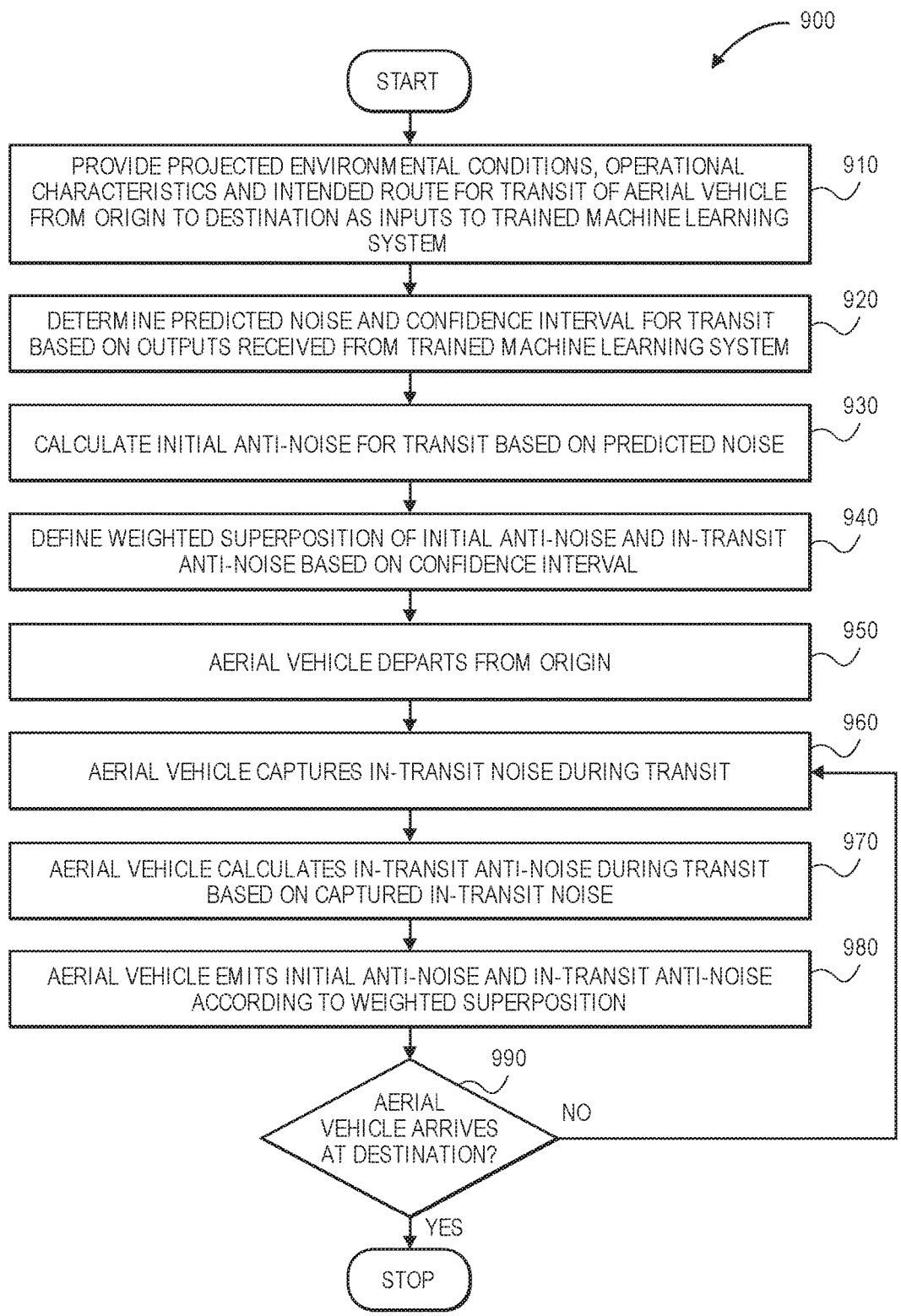
FIG. 9 is a flow chart of one process for active airborne noise abatement in accordance with embodiments of the present disclosure.

Referring to FIG. 9, a flow chart 900 of one process for active airborne noise abatement in accordance with embodiments of the present disclosure is shown. At box 910, projected environmental conditions, operational characteristics and an intended route for a transit of an aerial vehicle from an origin to a destination are provided to a trained machine learning system. For example, a transit plan identifying locations of an origin to a destination, a course and speed at which the aerial vehicle is to travel from the origin to the destination may be provided to the trained machine learning system, along with any weather projections, ground conditions, cloud coverage, sunshine or other variables regarding the environment at the origin and the destination, and along the course between the origin and the destination.

At box 920, a predicted noise and a confidence interval for the transit are determined based on outputs received from the trained machine learning system. The predicted noise may include a sound pressure level or intensity (e.g., measured in decibels) and a frequency (e.g., measured in Hertz), and any other relevant parameters. Additionally, the predicted noise may be constant for the entire transit, or two or more predicted noises may be identified for varying aspects of the transit, e.g., a predicted noise for when the aerial vehicle is within a vicinity of the origin, a predicted noise for when the aerial vehicle is within a vicinity of the destination, and predicted noises for when the aerial vehicle is located at one or more positions (e.g., waypoints) along the route between the origin and the destination. Similarly, the confidence interval may be constant for the entire transit, or may vary based on the different aspects of the transit.

At box 930, an initial anti-noise is calculated for the transit based on the predicted noise. The initial anti-noise may have a sound pressure level or intensity selected based on the sound pressure level or intensity of the predicted noise (e.g., the initial anti-noise may be intended to completely eliminate the effects of the predicted noise, or to reduce the effects of the predicted noise), and a frequency that is one hundred eighty degrees out-of-phase with the frequency of the predicted noise.

At 940, a weighted superposition of the initial anti-noise and in-transit anti-noise is determined based on the confidence interval. For example, where the initial anti-noise may not be determined with a sufficiently high degree of confidence, in-transit noises generated or encountered during a transit of an aerial vehicle may be captured and evaluated, and an anti-noise associated with those in-transit noises may be emitted during the transit of the aerial vehicle. In some embodiments, the weighted superposition may weigh the emission of the initial anti-noise based on the confidence interval associated with the predicted noise. For example, where the confidence interval is seventy-five percent (75%), the weighted superposition may call for reducing the original sound pressure level or intensity of the initial anti-noise to seventy-five percent (75%) thereof, and for reducing the sound pressure level or intensity of the in-transit anti-noise to twenty-five percent (25%) thereof. In another example, where the confidence interval is sixty percent (60%), the weighted superposition may call for reducing the original sound pressure level or intensity of the initial anti-noise to sixty percent (60%) thereof, and for reducing the sound pressure level or intensity of the in-transit anti-noise to forty percent (40%) thereof.

At box 950, the aerial vehicle departs from the origin, and at box 960, the aerial vehicle captures in-transit noise during the transit from the origin to the destination. For example, the aerial vehicle may include one or more components or features for detecting and capturing sound energy, e.g., a microphone, a piezoelectric sensor, a vibration sensor, or any other type of device, component, system, or instrument, such as a transducer, for converting acoustic energy into one or more electrical signals. At box 970, the aerial vehicle calculates an in-transit anti-noise based on the captured in-transit noise. For example, the in-transit anti-noise may have a sound pressure level or intensity (e.g., an amplitude) that is equal to the sound pressure levels or intensities of one or more of the sounds that are captured during the flight of the aerial vehicle, and a frequency that is one hundred eighty degrees out-of-phase with the frequency of the predicted noise.

At box 980, the aerial vehicle emits the initial anti-noise calculated at box 930 and the in-transit anti-noise determined at box 970 according to the weighted superposition. For example, where the weighted superposition calls for emitting the initial anti-noise at eighty percent (80%) of the original sound pressure level or intensity and the in-transit anti-noise at twenty percent (20%) of the original sound pressure level or intensity, the two anti-noises may be emitted according to such weights, and emitted simultaneously. In this regard, the quality of the initial predictions of noises that are to be generated or encountered by the aerial vehicle may be enhanced based on in situ measurements, which may be used to calculate in-transit anti-sounds that may augment the initial anti-noise determined based on such initial predictions. At box 990, whether the aerial vehicle arrives at the destination is determined, e.g., based on one or more GPS receiver or sensors, and the process ends.

Figure 10:
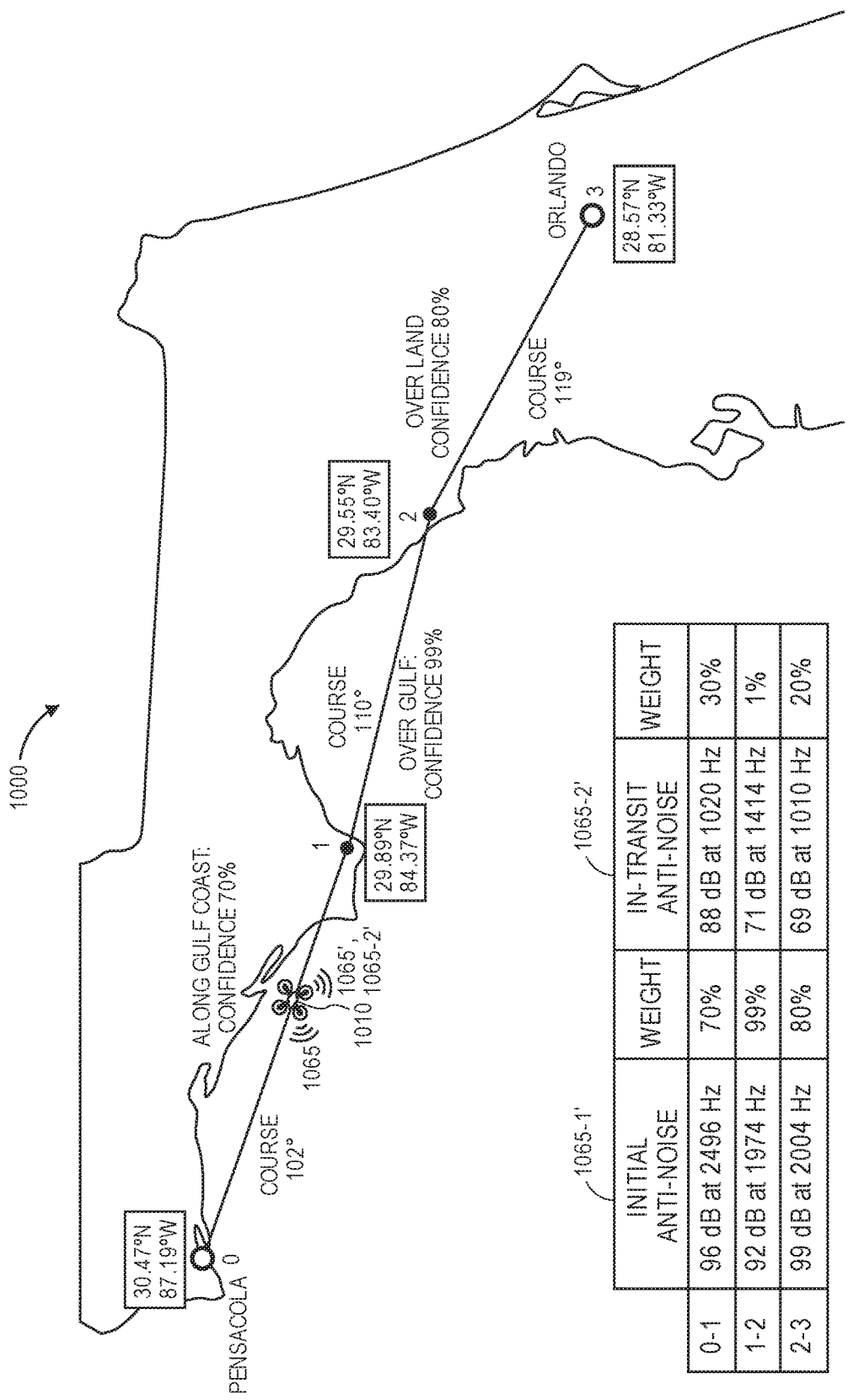
FIG. 10 is a view of aspects of one system for active airborne noise abatement in accordance with embodiments of the present disclosure.

One example of the emission of anti-noise according to weighted superpositions is shown in FIG. 10. Referring to FIG. 10, views of aspects of one system 1000 for active airborne noise abatement in accordance with embodiments of the present disclosure are shown. Except where otherwise noted, reference numerals preceded by the number "10" shown in FIG. 10 indicate components or features that are similar to components or features having reference numerals preceded by the number "8" shown in FIG. 8A or FIG. 8B, by the number "6" shown in FIG. 6, by the number "5" shown in FIG. 5, by the number "3" shown in FIG. 3, by the number "2" shown in FIG. 2 or by the number "1" shown in FIGS. 1A through 1D.

As is shown in FIG. 10, an aerial vehicle 1010 is en route from an origin in Pensacola, Fla., to a destination in Orlando, Fla., along a route that passes along the coast of the Gulf of Mexico in western Florida at a course of 102°, then over a portion of the Gulf of Mexico at a course of 110°, and finally over land central Florida at a course of 119°. The aerial vehicle 1010 emits a variety of noise 1065 while en route to Orlando.

In accordance with the present disclosure, an initial anti-noise 1065-1' may be determined for the aerial vehicle 1010 by providing information regarding the planned transit (e.g., a transit plan identifying the origin, the destination and the intervening waypoints, as well as predicted environmental conditions such as altitudes, courses, speeds, climb or descent rates, turn rates, accelerations, wind velocities, humidity levels and temperatures or operational characteristics of the aerial vehicle) to a sound model developed by a trained machine learning system. An output of the sound model may include information or data regarding sounds that may be generated or encountered by the aerial vehicle 1010 during operations, and the initial anti-noise 1065-1' may be defined based on the output of the sound model, in terms of sound pressure levels or intensities and frequencies. For example, as is shown in FIG. 10, the initial anti-noise 1065-1' includes a sound pressure level of 96 dB and a frequency of 2496 Hz for the first leg of the transit between Pensacola and the first waypoint, a sound pressure level of 92 dB and a frequency of 1974 Hz for the second leg of the transit between the first and second waypoints, and a sound pressure level of 99 dB and a frequency of 2004 Hz for the third leg of the transit between the second waypoint and Orlando.

Additionally, the sound model may further determine a confidence interval (or a confidence level or another measure or metric of a probability or likelihood) that the output of the sound model, which was itself determined based on extrinsic or intrinsic information or data such as the transit plan and any environmental conditions or operational characteristics of the transit, is accurate or precise. For example, the confidence interval may vary throughout a transit due to factors such as varying surface conditions (e.g., differing sound reflecting or propagating properties of sand, swamp or salt water), cloud coverage (e.g., moisture-rich clouds or dry air), winds or sunshine. As is shown in FIG. 10, the confidence interval for the first leg of the transit is seventy percent (70%), while the confidence intervals for the second and third legs of the transit are ninety-nine percent (99%) and eighty percent (80%), respectively. Moreover, because the initial anti-noise 1065-1' is determined based on outputs of the sound model, the confidence intervals of the outputs of the sound model may be directly correlated with a confidence in the initial anti-noise 1065-1' calculated based on such outputs.

In accordance with the present disclosure, anti-noise emitted during operation of an aerial vehicle may be based on a weighted superposition of two or more anti-noises, such as two or more anti-noises determined based on two discrete predicted noises, or, in some embodiments, both an initial anti-noise calculated based on predicted noise generated or encountered by an aerial vehicle during operations, and an in-transit anti-noise calculated based on actual noise captured by the aerial vehicle, e.g., by one or more microphones, piezoelectric sensors, vibration sensors or other transducers or sensing devices provided on the aerial vehicle, during such operations. The relative intensities of the initial anti-noise and the in-transit anti-noise emitted by the aerial vehicle may be based on a weighted function that considers the confidence in the prediction of the noise from which the initial anti-noise was determined. Thus, the weighted superposition may incorporate the confidence interval associated with the initial anti-noise, or any other measure or metric of confidence in the initial anti-noise, or a probability or likelihood that the predicted noises will be generated or encountered by the aerial vehicle in transit.

Therefore, the initial anti-noise 1065-1' may be emitted simultaneously with in-transit anti-noise 1065-2' at relative ratios determined based on a level of confidence in the accuracy and precision of the predicted noises and, therefore, the initial anti-noise 1065-1'. For example, referring again to FIG. 10, along the first leg of the transit, the initial anti-noise 1065-1' may be emitted at seventy percent (70%) of its original sound pressure level or intensity, and the in-transit anti-noise 1065-2' may be emitted at thirty percent (30%) of its original sound pressure level or intensity. Likewise, along the second leg of the transit, the initial anti-noise 1065-1' may be emitted at ninety-nine percent (99%) of its original sound pressure level or intensity, and the in-transit anti-noise 1065-2' may be emitted at one percent (1%) of its original sound pressure level or intensity. Along the third leg of the transit, the initial anti-noise 1065-1' may be emitted at eighty percent (80%) of its original sound pressure level or intensity, and the in-transit anti-noise 1065-2' may be emitted at twenty percent (20%) of its original sound pressure level or intensity.

As is discussed above, anti-noise may be identified based on not only aspects of a transit plan (e.g., noises that may be expected at given locations or times, or at various altitudes, courses, speeds, climb or descent rates, turn rates, or accelerations) but also the various components of expected noises. For example, where an aerial vehicle includes two or more discrete sources from which the emission of noise may be expected, anti-noises may be identified for each of such sources, or the noises emitted thereby, and the anti-noises may be emitted independently in response to such noises.

Figure 11:
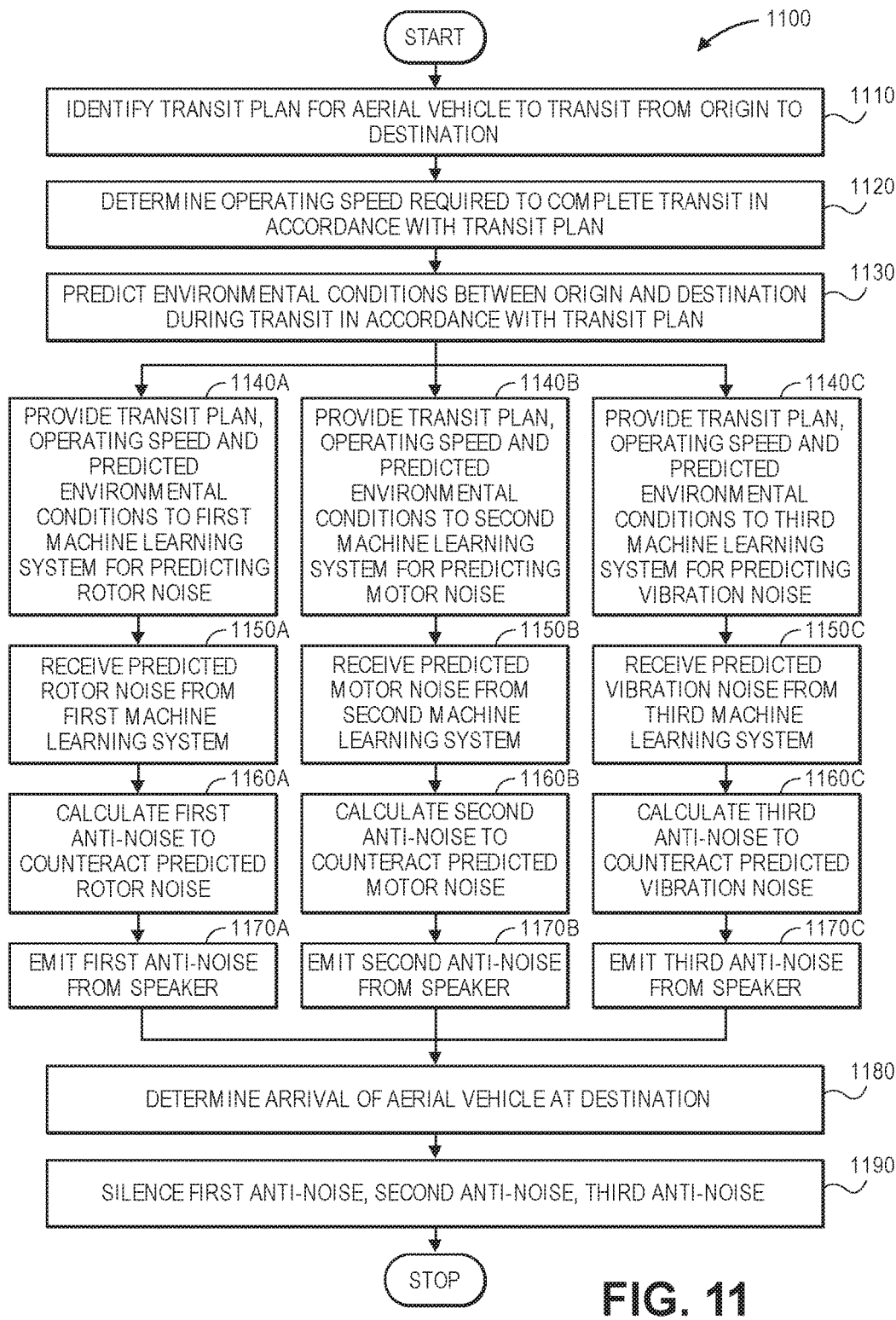
FIG. 11 is a flow chart of one process for active airborne noise abatement in accordance with embodiments of the present disclosure.

Referring to FIG. 11, a flow chart 1100 of one process for active airborne noise abatement in accordance with embodiments of the present disclosure is shown. At box 1110, a transit plan is identified for an aerial vehicle to transit from an origin to a destination. The transit plan may identify a purpose for the transit, the origin, the destination, any intervening waypoints, or any other relevant information regarding the transit. At box 1120, an operating speed required to complete the transit in accordance with the transit plan is determined, and at box 1130, environmental conditions between the origin and the destination during the transit are predicted. For example, the operating speed may be calculated based on a distance between the origin and the destination, an intended elapsed time for the transit, or any operational constraints of the aerial vehicle, as well as the environmental conditions predicted at box 1130, which may, in some instances, impede or aid the aerial vehicle during the transit.

In series or in parallel, anti-noises may be identified and emitted from the aerial vehicle based on various elements or components of predicted noise. At box 1140A, the transit plan, the operating speed, and the predicted environmental conditions may be provided to a first machine learning system for predicting rotor noise. For example, the first machine learning system may have been trained using information or data regarding noises associated with one or more rotors on the aerial vehicle, which may be correlated with locations, operating speeds, environmental conditions or other factors. At box 1150A, a predicted rotor noise is received from the first machine learning system, and at box 1160A, a first anti-noise is calculated to counteract the predicted rotor noise. At box 1170A, the first anti-noise is emitted from a speaker or, alternatively, another sound emitting device.

Similarly, at box 1140B, the transit plan, the operating speed, and the predicted environmental conditions may be provided to a second machine learning system for predicting motor noise, and at box 1150B, a predicted motor noise is received from the second machine learning system. At box 1160B, a second anti-noise is calculated to counteract the predicted motor noise, and at box 1170B, the second anti-noise is emitted from a speaker or other sound-emitting device. Likewise, at box 1140C, the transit plan, the operating speed and the predicted environmental conditions may be provided to a third machine learning system for predicting vibration noise, and at box 1150C, a predicted vibration noise is received from the third machine learning system. At box 1160B, a third anti-noise is calculated to counteract the predicted vibration noise, and at box 1170B, the third anti-noise is emitted from a speaker or other sound-emitting device.

At box 1180, the arrival of the aerial vehicle at the destination is determined. For example, a position sensor onboard the aerial vehicle may determine that the aerial vehicle is at or near a location associated with the destination, e.g., to within a predetermined tolerance. At box 1190, the first noise, the second noise and the third noise are silenced, and the process ends.

Figure 12A:
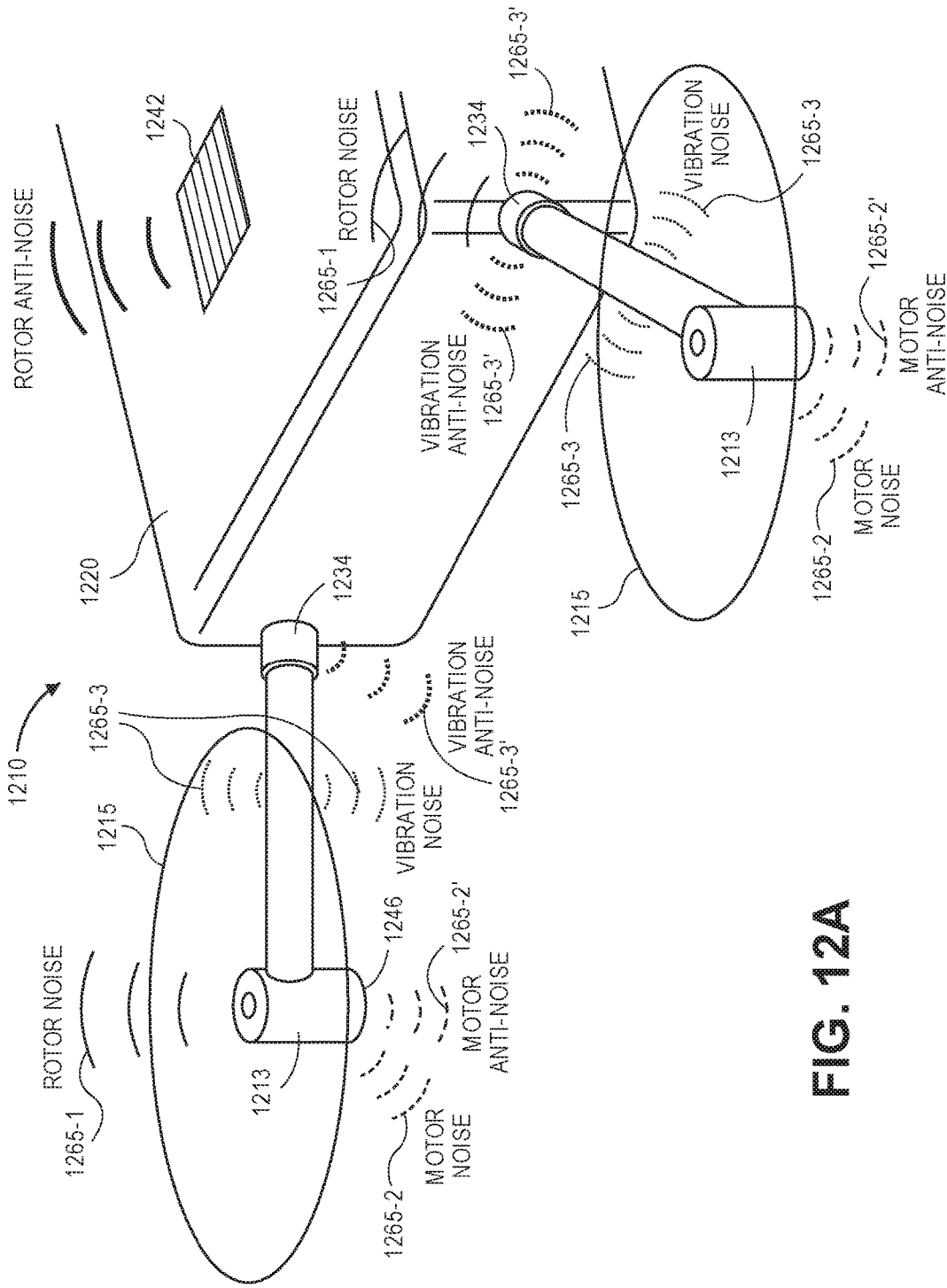

An aerial vehicle may be configured to simultaneously emit various anti-noises in parallel, and in response to noises emitted or encountered by the aerial vehicle, during operation. Referring to FIGS. 12A and 12B, views of aspects of one system for active airborne noise abatement in accordance with embodiments of the present disclosure are shown. Except where otherwise noted, reference numerals preceded by the number "12" shown in FIG. 12A or FIG. 12B indicate components or features that are similar to components or features having reference numerals preceded by the number "10" shown in FIG. 10, by the number "8" shown in FIG. 8A or FIG. 8B, by the number "6" shown in FIG. 6, by the number "5" shown in FIG. 5, by the number "3" shown in FIG. 3, by the number "2" shown in FIG. 2 or by the number "1" shown in FIGS. 1A through 1D.

As is shown in FIG. 12A, an aerial vehicle 1210 includes a plurality of motors 1213, a plurality of rotors 1215 and a set of onboard sensors 1220, piezoelectric elements 1234 joining components of the aerial vehicle 1210 to one another, and an audio speaker 1242. As is shown in FIG. 12A and FIG. 12B, the aerial vehicle 1210 is further configured to emit anti-noise in response to noises encountered or generated during operations. For example, where the rotors 1215 are predicted or known to emit a first rotor noise 1265-1, a first rotor anti-noise 1265-1' may be emitted from the audio speaker 1242. Where the rotors 1213 are predicted or known to emit a second motor noise 1265-2, a second motor anti-noise 1265-2' may be emitted from the motors 1213 themselves, e.g., from one or more internal speakers or other sound emitting elements therein, such as a PC speaker. Where the components of the aerial vehicle 1210 are predicted or known to emit a third vibration noise 1265-3, a third vibration anti-noise 1265-3' may be emitted from the piezoelectric elements 1234 joining the various components, e.g., by applying a charge to a crystal provided therein and causing such elements 1234 to vibrate at a resonance frequency.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

Moreover, although some of the embodiments disclosed herein depict the use of aerial vehicles having sensors for detecting sound pressure levels, environmental conditions, operational characteristics and positions, and devices or components for emitting anti-noise, the systems and methods of the present disclosure are likewise not so limited. For example, a first aerial vehicle may feature sensors for detecting sound pressure levels, environmental conditions, operational characteristics and positions, and provide information or data regarding such sound pressure levels, environmental conditions, operational characteristics or positions to a machine learning system, which may be trained to associate such environmental conditions, operational characteristics or positions with sound pressure levels. Subsequently, information or data regarding a transit of a second aerial vehicle may be provided as an input to the machine learning system and an anti-noise to be emitted by the second aerial vehicle may be determined based on an output from the machine learning system.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 4, 7, 9 or 11, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
   a frame;
   a plurality of propulsion motors mounted to the frame, wherein each of the plurality of propulsion motors is rotatably coupled to a propeller;
   at least one sound emitting device mounted to the frame, wherein the at least one sound emitting device is at least one of an audio speaker, a piezoelectric sound emitter or a vibration source provided on the first aerial vehicle; and
   a computing system having one or more computer processors, wherein the computing system is in communication with each of the plurality of propulsion motors and the at least one sound emitting device, and wherein the computing system is further configured to at least:
      determine information regarding an operation of the aerial vehicle, wherein the operation of the aerial vehicle comprises at least one of:
         traveling on a selected course;
         traveling at a selected velocity;
         traveling at a selected altitude;
         traveling from a selected origin;
         traveling to a selected destination; or
         hovering;
      provide at least some of the information regarding the operation of the aerial vehicle as an input to a sound model operated by the computing system;
      receive an output from the sound model;
      predict at least a first noise signal based at least in part on the output, wherein the noise signal has a first sound pressure level and a first frequency;
      initiate the operation of the aerial vehicle by at least one of the plurality of propulsion motors; and
      during the operation of the aerial vehicle,
         emit at least a second noise signal by the at least one sound emitting device,
         wherein the second noise signal has a second sound pressure level and a second frequency,
         wherein the second sound pressure level is not greater than the first sound pressure level, and
         wherein the second frequency is of reverse polarity to the first frequency.

2. The aerial vehicle of claim 1, wherein the computing system is further configured to at least:
   predict a first plurality of noise signals based at least in part on the output, wherein each of the first plurality of noise signals has a sound pressure level and a narrowband frequency relating to one of the plurality of propulsion motors, and wherein the first noise signal is one of the first plurality of noise signals; and
   emit a second plurality of noise signals by the at least one sound emitting device during the operation of the aerial vehicle, wherein each of the second plurality of noise signals has a sound pressure level not greater than a sound pressure level of a corresponding one of the first plurality of noise signals, wherein each of the second plurality of noise signals has a narrowband frequency that is of reverse polarity to a narrowband frequency of a corresponding one of the first plurality of noise signals, and wherein the second noise signal is one of the second plurality of noise signals.

3. The aerial vehicle of claim 1, wherein the computing system is further configured to at least:
predict a first plurality of noise signals based at least in part on the output, wherein the first noise signal is one of the first plurality of noise signals;
calculate a confidence interval for each of the first plurality of noise signals;
determine a weighted superposition based at least in part on the confidence intervals for each of the first plurality of noise signals;
determine a second plurality of noise signals based at least in part on the first plurality of noise signals, wherein each of the second plurality of noise signals has a sound pressure level not greater than a sound pressure level of a corresponding one of the first plurality of noise signals, wherein each of the second plurality of noise signals has a narrowband frequency that is of reverse polarity to a narrowband frequency of a corresponding one of the first plurality of noise signals, and wherein the second noise signal is one of the second plurality of noise signals; and
emit the second plurality of noise signals by the at least one sound emitting device in accordance with the weighted superposition during the operation of the aerial vehicle.

4. The aerial vehicle of claim 1, further comprising at least one sensor configured to determine at least one of a temperature, an atmospheric pressure or a humidity within a vicinity of the aerial vehicle,
wherein the computing system is in communication with the at least one sensor, and
wherein the computing system is further configured to at least:
capture data by the at least one sensor at a first time, wherein the input comprises the at least some of the information regarding the operation of the aerial vehicle and at least some of the data captured by the at least one sensor at the first time,
wherein the operation of the aerial vehicle is initiated at a second time, and
wherein the second time follows the first time.

5. An aerial vehicle comprising:
a frame;
at least one motor mounted to the frame, wherein the at least one motor is rotatably coupled to at least one propeller;
a sound emitting device; and
a first computer system having a memory and one or more computer processors,
wherein the first computer system is in communication with each of the at least one motor and the sound emitting device, and
wherein the one or more computer processors are configured to execute a method comprising:
determining information regarding a first operation of the aerial vehicle, wherein the information regarding the first operation of the aerial vehicle relates to at least one of a course of the aerial vehicle, a velocity of the aerial vehicle, an altitude of the aerial vehicle, an operating speed of the at least one motor, a position of the aerial vehicle, or an environmental condition at the position of the aerial vehicle;
providing at least some of the information regarding the first operation of the aerial vehicle to a machine learning system as a first input;
receiving a first output from the machine learning system;
determining information regarding a first sound based at least in part on the first output, wherein the first sound has a first sound pressure level and a first frequency; and
causing at least a second sound to be emitted by the sound emitting device during the first operation of the aerial vehicle, wherein the second sound has a second sound pressure level and a second frequency, and wherein the second frequency is approximately one hundred eighty degrees out-of-phase with the first frequency.

6. The aerial vehicle of claim 5, wherein the machine learning system is operated by the first computer system.

7. The aerial vehicle of claim 6, wherein determining the information regarding the first sound comprises:
predicting the information regarding the first sound based at least in part on the first output according to the Nyquist frequency.

8. The aerial vehicle of claim 5, further comprising a transceiver,
wherein providing the at least some of the information regarding the first operation of the aerial vehicle to the machine learning system as the first input comprises:
transmitting, by the transceiver, the at least some of the information regarding the first operation of the aerial vehicle to a second computer system over a network, wherein the machine learning system is operated by the second computer system, and wherein receiving the first output comprises:
receiving, by the transceiver, the first output from the second computer system over the network.

9. The aerial vehicle of claim 5, wherein the method further comprises:
determining information regarding an environmental condition in a vicinity of the position of the aerial vehicle,
wherein providing the at least some of the information regarding the first operation of the aerial vehicle to the machine learning system as the first input comprises:
providing the at least some of the information regarding the first operation of the aerial vehicle and at least some of the information regarding the environmental condition in the vicinity of the position of the aerial vehicle to the machine learning system as the first input.

10. The aerial vehicle of claim 5, wherein the first operation comprises operating the aerial vehicle at the velocity, and
wherein the method further comprises:
initiating the first operation of the aerial vehicle by the at least one motor; and
determining, during the first operation of the aerial vehicle, that the aerial vehicle is approaching the velocity, and
wherein at least the second sound is caused to be emitted by the sound emitting device in response to determining that the aerial vehicle is approaching the velocity.

11. The aerial vehicle of claim 5, wherein the first operation of the aerial vehicle comprises operating the aerial vehicle at the altitude, and
wherein the method further comprises:
initiating the first operation of the aerial vehicle by the at least one motor; and determining, during the first operation of the aerial vehicle, that the aerial vehicle is approaching the altitude, and wherein at least the second sound is caused to be emitted by the sound emitting device in response to determining that the aerial vehicle is approaching the altitude.

12. The aerial vehicle of claim 5, wherein the first operation of the aerial vehicle comprises operating the aerial vehicle in a vicinity of the location, and wherein the method further comprises:

initiating the first operation of the aerial vehicle by the at least one motor; and determining, during the first operation of the aerial vehicle, that the aerial vehicle is approaching the location, and wherein at least the second sound is caused to be emitted by the sound emitting device in response to determining that the aerial vehicle is approaching the location.

13. The aerial vehicle of claim 5, further comprising an acoustic sensor, and wherein the method further comprises:

identifying information regarding at least one noise threshold associated with at least one of the course, the velocity, the altitude, the operating speed, the position or the environmental condition, and wherein determining the information regarding the first sound based at least in part on the first output comprises:

determining the information regarding the first sound based at least in part on the first output and the information regarding the at least one noise threshold.

14. The aerial vehicle of claim 13, further comprising an acoustic sensor, and wherein the method further comprises:

capturing acoustic energy by the acoustic sensor;

determining that at least some of the acoustic energy exceeds the at least one noise threshold, wherein at least the second sound is caused to be emitted by the sound emitting device in response to determining that the at least some of the acoustic energy exceeds the at least one noise threshold.

15. The aerial vehicle of claim 5, wherein determining the information regarding the first sound based at least in part on the first output comprises:

determining information regarding a first plurality of sounds based at least in part on the first output, wherein the first sound is one of the first plurality of sounds;

calculating a confidence interval for each of the first plurality of sounds; and determining a weighted superposition based at least in part on the confidence intervals for each of the first plurality of sounds, and wherein causing at least the first sound to be emitted by the sound emitting device during the first operation of the aerial vehicle comprises:

determining information regarding a second plurality of sounds based at least in part on the first plurality of sounds, wherein each of the second plurality of sounds has a sound pressure level not greater than a sound pressure level of a corresponding one of the first plurality of sounds, wherein each of the second plurality of sounds has a frequency that is of reverse polarity to a frequency of a corresponding one of the first plurality of sounds, and wherein the second sound is one of the second plurality of sounds; and causing the second plurality of sounds to be emitted by the at least one sound emitting device in accordance with the weighted superposition during the first operation of the aerial vehicle.

16. The aerial vehicle of claim 5, wherein the machine learning system is at least one of:

an artificial neural network;
a conditional random field;
a cosine similarity analysis;
a factorization method;
a K-means clustering analysis;
a latent Dirichlet allocation;
a latent semantic analysis;
a log likelihood similarity analysis;
a nearest neighbor analysis;
a support vector machine; or
a topic model analysis.

17. A method comprising:

determining, by at least a first sensor provided aboard a first aerial vehicle at a first time, first data regarding at least one of:

an operating speed of at least a first propulsion motor provided aboard the first aerial vehicle at the first time;

a course of the first aerial vehicle at the first time;

a velocity of the first aerial vehicle at the first time;

an altitude of the first aerial vehicle at the first time; or an environmental condition within a vicinity of the first aerial vehicle at the first time;

capturing, by at least a second sensor provided aboard the first aerial vehicle at the first time, second data regarding acoustic energy emitted by the first aerial vehicle at the first time;

training a machine learning system to associate at least some of the first data with at least some of the second data;

defining a sound model by the trained machine learning system;

programming a computer system provided aboard a second aerial vehicle with instructions for executing the sound model;

identifying third data regarding at least one of:

an operating speed of at least a second propulsion motor provided aboard the second aerial vehicle at a second time;

a course of the second aerial vehicle at the second time;

a velocity of the second aerial vehicle at the second time;

an altitude of the second aerial vehicle at the second time; or an environmental condition within a vicinity of the second aerial vehicle at the second time;

providing at least some of the third data to the sound model as an input;

receiving an output from the sound model;

predicting acoustic energy to be emitted by the second aerial vehicle at the second time based at least in part on the output, wherein the predicted acoustic energy comprises at least a first narrowband tonal centered around a frequency;

selecting at least a second narrowband tonal based at least in part on the predicted acoustic energy, wherein the second narrowband tonal has a frequency that is approximately one hundred eighty degrees out-of-phase with the frequency of the first narrowband tonal; and emitting at least the second narrowband tonal by at least one acoustic device provided aboard the second aerial vehicle at or after the second time.

18. The method of claim 17, wherein each of the second aerial vehicle and the first aerial vehicle have at least one attribute in common.

19. The method of claim 17, wherein the predicted acoustic energy comprises a first plurality of narrowband tonals,
wherein each of the first plurality of narrowband tonals is centered around one of a plurality of frequencies,
wherein the first narrowband tonal is one of the first plurality of narrowband tonals,
wherein selecting at least the second narrowband tonal based at least in part on the predicted acoustic energy comprises:
selecting a second plurality of narrowband tonals based at least in part on the predicted acoustic energy, wherein each of the second plurality of narrowband tonals has a frequency that is approximately one hundred eighty degrees out-of-phase with one of the plurality of frequencies of the first plurality of narrowband tonals; and
determining a weighted superposition of the second plurality of narrowband tonals, and
wherein emitting at least the second narrowband tonal by the at least one acoustic device comprises:
emitting each of the second plurality of narrowband tonals in accordance with the weighted superposition by the at least one acoustic device.

20. The method of claim 17, wherein selecting the sound based at least in part on the predicted acoustic energy comprises:
identifying a noise threshold based at least in part on the third data, wherein the noise threshold is associated with at least one of the operating speed of at least the second propulsion motor provided aboard the second aerial vehicle at the second time, the course of the second aerial vehicle at the second time, the velocity of the second aerial vehicle at the second time, the altitude of the second aerial vehicle at the second time or the environmental condition within a vicinity of the second aerial vehicle at the second time; and
selecting the sound based at least in part on the predicted acoustic energy and the noise threshold.

* * * * *